(12) United States Patent
Aschwanden et al.

(10) Patent No.: US 12,411,349 B2
(45) Date of Patent: *Sep. 9, 2025

(54) OPTICAL DEVICE FOR ENHANCING RESOLUTION OF AN IMAGE OR FOR REDUCING SPECKLE NOISE

(71) Applicant: OPTOTUNE AG, Dietikon (CH)

(72) Inventors: Manuel Aschwanden, Allenwinden (CH); Marcel Suter, Zürich (CH); Stephan Smolka, Zürich (CH); Roman Patscheider, Winterthur (CH); David Andreas Niederer, Küttigen (CH)

(73) Assignee: OPTOTUNE SWITZERLAND AG, Dietikon (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/418,384

(22) Filed: Jan. 22, 2024

(65) Prior Publication Data

US 2024/0160027 A1 May 16, 2024

Related U.S. Application Data

(63) Continuation of application No. 17/270,021, filed as application No. PCT/EP2019/072306 on Aug. 20, 2019, now Pat. No. 11,880,044.

(30) Foreign Application Priority Data

Aug. 20, 2018 (EP) .................................... 18189834
Jan. 31, 2019 (EP) .................................... 19154900

(51) Int. Cl.
*G02B 27/48* (2006.01)
*G02B 27/09* (2006.01)
*G03B 21/14* (2006.01)

(52) U.S. Cl.
CPC ......... *G02B 27/0933* (2013.01); *G02B 27/48* (2013.01)

(58) Field of Classification Search
CPC ... G02B 27/0933; G02B 27/48; G03B 21/142
See application file for complete search history.

(56) References Cited

U.S. PATENT DOCUMENTS

| 5,402,184 A | 3/1995 | O'Grady |
| 5,898,515 A | 4/1999 | Furlani |
| 7,279,812 B2 | 10/2007 | Barnes |
| 11,880,044 B2 * | 1/2024 | Aschwanden .......... B06B 1/045 |
| 2010/0118278 A1 | 5/2010 | Kobayashi |
| 2011/0043768 A1 | 2/2011 | Nakayama |

(Continued)

FOREIGN PATENT DOCUMENTS

| CN | 1727980 | 2/2006 |
| CN | 101718908 | 6/2010 |

(Continued)

OTHER PUBLICATIONS

You Qiaoming et al: "Laser speckle reduction by a hybrid MEMS diffuser device with continuous height profile", Microsystem Technologies, Berlin, DE, vol. 24, No. 6, Dec. 8, 2017 (Dec. 8, 2017), pp. 2561-2568.

*Primary Examiner* — Ryan D Howard
(74) *Attorney, Agent, or Firm* — JMB Davis Ben-David

(57) ABSTRACT

The invention relates to an optical device (1) for enhancing the resolution of an image or for reducing speckle noise.

19 Claims, 13 Drawing Sheets

(56) References Cited

U.S. PATENT DOCUMENTS

2019/0196175 A1    6/2019  Hsu
2020/0033704 A1*   1/2020  Chao .................... G03B 21/142

FOREIGN PATENT DOCUMENTS

| | | |
|---|---|---|
| CN | 101770071 | 7/2010 |
| CN | 102207634 | 10/2011 |
| CN | 105242395 | 1/2016 |
| CN | 105763017 | 7/2016 |
| CN | 206039040 | 3/2017 |
| CN | 107430268 | 12/2017 |
| CN | 207020408 | 2/2018 |
| EP | 2884637 | 6/2015 |
| JP | 2007222203 | 9/2007 |
| JP | 2008002871 | 1/2008 |
| JP | 2009093081 | 4/2009 |
| JP | 2016071233 | 5/2016 |
| JP | 2017009998 | 1/2017 |
| KR | 101671924 | 11/2016 |
| TW | 201736904 | 10/2017 |
| WO | 2010078662 | 7/2010 |
| WO | 2016166980 | 10/2016 |
| WO | 2018019831 | 2/2018 |

* cited by examiner

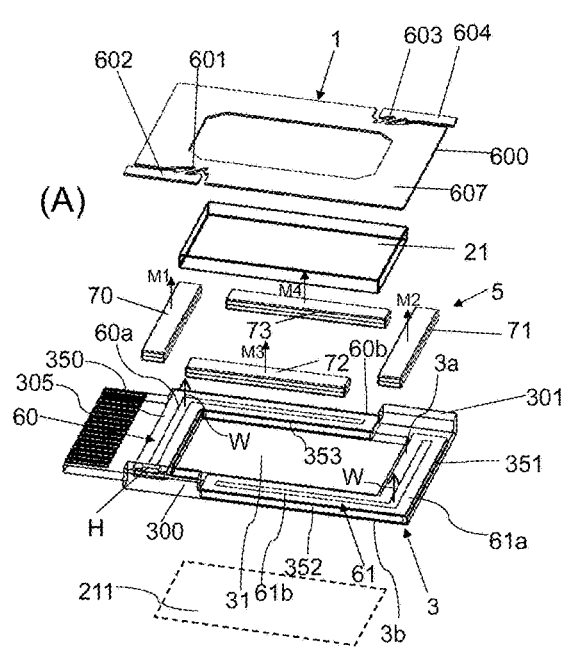
Fig. 1A
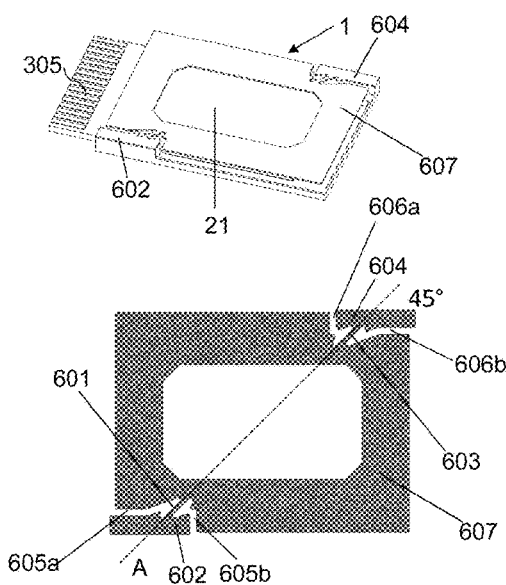
Fig. 1B
Fig. 1C

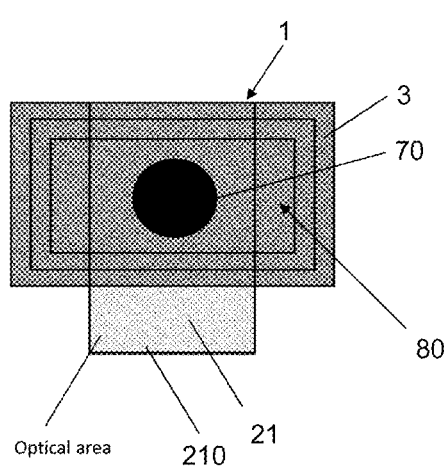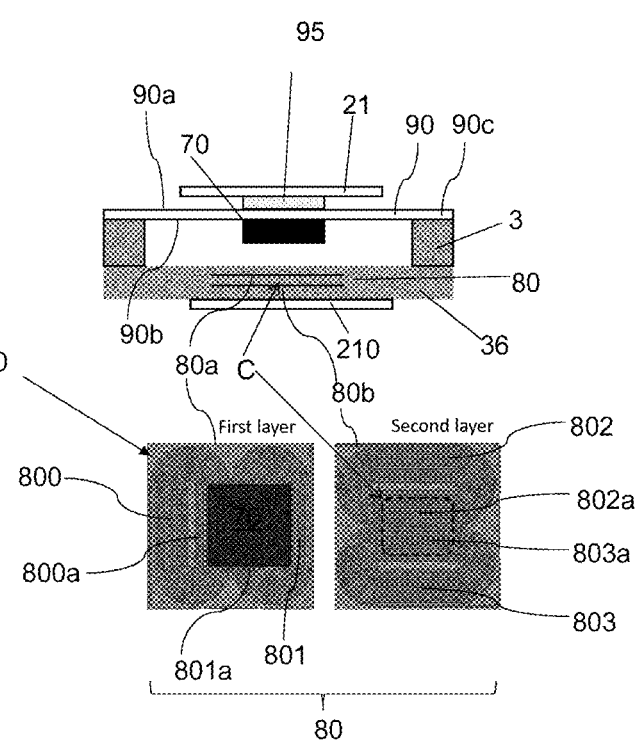

OPTICAL DEVICE FOR ENHANCING RESOLUTION OF AN IMAGE OR FOR REDUCING SPECKLE NOISE

CROSS-REFERENCE TO RELATED APPLICATIONS

This is a continuation of U.S. patent application Ser. No. 17/270,021, filed on Feb. 21, 2021, which is the U.S. National Stage of International Patent Application No. PCT/EP2019/072306 filed on Aug. 20, 2019, which in turn claims the benefit of European Patent Application No. 18189834.7 filed on Aug. 20, 2018 and European Patent Application No. 19154900.5 filed on Jan. 31, 2019.

FIELD

The present invention relates to optical devices, particularly for enhancing resolution of an image or for reducing speckle noise.

BACKGROUND

Such an optical device for enhancing resolution of an image usually comprises a transparent plate (e.g. glass window) configured for refracting a light beam passing through the plate, which light beam can project an image comprised of rows and columns of pixels. The plate is configured to be tilted between a first and a second position (e.g. about a first axis), such that the plate is tilted back and forth between the first and the second position, whereby said light beam is shifted (e.g. said projected image is shifted by a fraction of a pixel (usually by a half of a pixel) along a first direction). The device further comprises an actuator that is configured to tilt the plate between the first and the second position. Optical devices of this kind are for instance disclosed in U.S. Pat. No. 7,279,812 as well as in U.S. Pat. No. 5,402,184.

The afore-mentioned enhancement of an image by overlapping of pixels is also known as super resolution projection or imaging. Here, e.g. a temporal sequence of frames is split into two sub-frames, wherein to successive sub-frames may be displaced with respect to each other by a fraction of a pixel (e.g. one-half or one-third). The sub-frames are projected in a sufficiently fast manner so that they appear to the human eye as if they are being projected simultaneously and superimposed. For instance, in case the sub-frames are aligned such that the corners of the pixels in one sub-frame are projected on the centers of the next sub-frame and so on, the illusion of a resolution can be achieved that seems twice as high. These kind of pixel shifting can be performed in one dimension (e.g. shifting in x-direction), but may also be performed in two dimensions (2D), e.g. shifting in x- as well as in y-direction of the image (i.e. shifting along the rows and columns of the digital image or shifting the pixel diagonally).

Furthermore, optical devices that are configured to reduce speckle noise generated by a laser usually comprise at least one optical element that acts as a diffusor, i.e., scatters light, and that extends along an extension plane as well as an actuator means designed for oscillating said first optical element along said extension plane, e.g. in a first and/or second motion direction along said plane. Alternatively, the diffusor/optical element can also be tilted about an axis that may extend in a plane along which the diffuser extends.

An optical device of this kind is often used with laser light in order to suppress Speckle noise, which is an interference pattern that is created on the screen (objective speckles) or the retina of the human eye (subjective speckles) due to the high coherency of the laser light.

Such a reduction can be accomplished by letting the light or laser beam pass through or reflect on a moving/oscillating diffuser. In case the frequency is high enough, the human brain integrates the perceived light over time which reduces the perceived speckle noise significantly. Such an optical device is for instance disclosed in US2011/0043768 which describes a magnet-coil based moving diffuser with complex springs as well as in WO2010078662 which relates to a movable diffuser based on an actuation by means of electroactive polymers.

SUMMARY

Based on the above the problem underlying the present invention is to provide an improved optical device, particularly for enhancing resolution of an image or for reducing speckle noise.

This problem is solved by an optical device having the features of claim 1. Further aspects of the present invention are also described below. Preferred embodiments of the aspects of the present invention are stated in the corresponding sub claims and are described below.

BRIEF DESCRIPTION OF THE FIGURES

In the following, embodiments of the various aspects of the present invention as well as further features and advantages of the present invention shall be described with reference to the Figures, wherein FIGS. 1A-1C shows an exploded view (FIG. 1A) and a perspective view (FIG. 1B) of an embodiment of an optical device according to the present invention comprising a tiltable transparent plate for enhancing resolution of an optical image, wherein (FIG. 1C) shows a top view of a tiltable frame of the device;

FIGS. 13A-13C show a schematical top view (FIG. 13A) and a schematical cross-sectional view (FIG. 13B) of a further embodiment of an optical device according to the present invention comprising a diffusor supported on an elastic membrane for achieving speckle pattern reduction, and (FIG. 13C) shows top views of components of an actuator of the device;

DETAILED DESCRIPTION

Figure 2A:
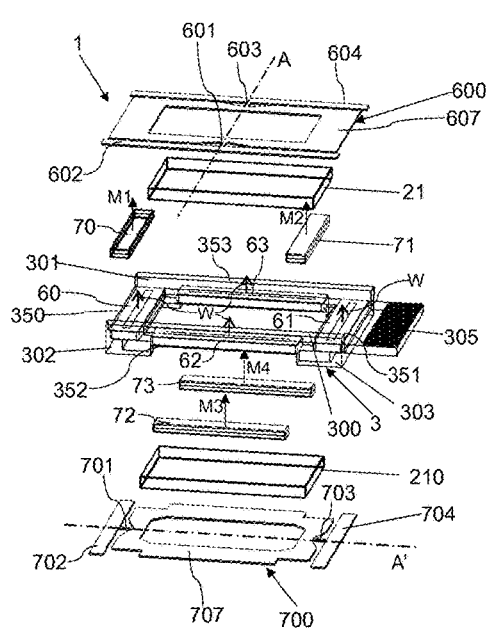
FIGS. 2A-2B show an exploded view (FIG. 2A) and a perspective view (FIG. 2B) of an embodiment of an optical device according to the present invention comprising two tiltable transparent plates for enhancing resolution of an optical image.

According to claim 1 an optical device, particularly for enhancing the resolution of an image or for reducing speckle noise, is disclosed, comprising:
an optical element configured to interact with a light beam when the light beam impinges on the optical element (e.g. a transparent first plate for refracting a light beam when the light beam passes through said first plate),
a support structure for supporting the optical element,
at least one elastic member (or several such members) connected to the support structure and to the optical element so that the optical element is movable (e.g. tiltable about a first axis) with respect to the support structure,
an actuator configured to move (particularly tilt) the optical element by means of a Lorentz force, wherein the actuator comprises a first coil and a second coil, wherein each coil comprises multiple windings, wherein the windings of the respective coil extend around a winding axis of the respective coil, and wherein said coils are integrated into the support structure, and wherein the actuator comprises a first magnet facing the first coil and a second magnet facing the second coil, wherein the first and the second magnet are connected to the optical element; preferably, the magnets each comprise a magnetization oriented at an angle between 80° and 100° degree with respect to a plane that extends perpendicular to the winding axes of said coils.

According to an embodiment, the support structure comprises a front side and a back side facing away from the front side.

Furthermore, the support structure is a support frame configured to support the optical element, wherein the support structure surrounds an opening of the support structure that extends from the front side of the support structure to the back side of the support structure so that light can pass the support structure (particularly, in case the optical element is a mirror, the support structure does not need to comprise such an opening).

Furthermore, in an embodiment, the at least one elastic member is a first spring structure connected to the front side of the support structure (or support frame), wherein the first spring structure comprises a first frame to which the optical element is connected, wherein the first frame is tiltable about a first axis with respect to the support frame, and wherein the actuator is configured to tilt the optical element about the first axis.

Furthermore, according to an embodiment of the optical device, the support structure (e.g. support frame) is formed by a printed circuit board (PCB), wherein particularly the first coil and the second coil (and particularly also the third and the fourth coil if present) are embedded in the printed circuit board. In other words, the coils are preferably formed as PCB coils, wherein each coil comprises a conductor forming windings that are integrated in the printed circuit board (or substrate) of the device/support structure. Particularly, the coils of all aspects and embodiments of the present invention described herein can be integrated into a substrate (e.g. printed circuit board).

Furthermore, according to an embodiment of the optical device, the support structure (particularly support frame) comprises a first arm that opposes a second arm of the support frame, wherein particularly the first and the second arm of the support frame extend parallel, and wherein the first and the second arm of the support frame are connected by a third and a fourth arm of the support frame, wherein particularly the third arm opposes the fourth arm, and wherein particularly the third arm and the fourth of the support frame arm extend parallel.

Furthermore, according to an embodiment of the optical device, the first spring structure comprises a first holding member that is connected via a first torsion bar to the first frame, and wherein the first spring structure comprises a second holding member that is connected via a second torsion bar to the first frame, wherein the first holding member is connected to the third arm of the support frame on the front side of the support frame and wherein the second holding member is connected to the fourth arm of the support frame on the front side of the support frame.

Furthermore, according to an embodiment of the optical device, the first torsion bar and the second torsion bar are aligned with the first axis.

Particularly, the first axis extends at an angle of 45° to each arm of the support frame of the device.

Further, particularly, the first holding member is separated from the first frame by two slots that comprise a width that increases towards the first torsion bar, and/or wherein the second holding member is separated from the first frame by two slots that comprise a width that increases towards the second torsion bar.

Further, according to an embodiment, the first coil is an L-shaped first coil that comprises a first portion that is integrated into the first arm of the support frame and a second portion that runs perpendicular to the first portion of the first coil, wherein the second portion of the first coil is integrated into the fourth arm of the support frame, and wherein the second coil is an L-shaped second coil that comprises a first portion that is integrated into the second arm of the support frame and a second portion that runs perpendicular to the first portion of the second coil, wherein the second portion of the second coil is integrated into the third arm of the support frame Further, according to an embodiment, the optical device comprises a third magnet facing the second coil and a fourth magnet facing the first coil, wherein the third and the fourth magnet are connected to the first frame, and wherein the first magnet faces the first portion of the first coil, and wherein the second magnet faces the first portion of the second coil, and wherein the third magnet faces the second portion of the second coil, and wherein the fourth magnet faces the second portion of the first coil, wherein particularly the third and the fourth magnet each comprise a magnetization that is oriented at an angle between 80° and 100° with respect to said plane.

Particularly, the magnetizations of the first and the second magnet point in the same direction. Furthermore, particularly, the magnetization of the third and the fourth magnet points in the same direction.

Furthermore, according to an embodiment of the optical device, the first magnet faces the first portion of the first coil such that a magnetic field generated by the first magnet comprises a component parallel to the support frame and perpendicular to a current flowing through the first portion of the first coil at the location of the first portion of the first coil such that a Lorentz force is generated when an electrical current is applied to the first coil that pushes the first magnet away from the first portion of the first coil or pulls the first magnet towards the first portion of the first coil depending on the direction of the electrical current in the first portion of the first coil.

Furthermore, in an embodiment, the fourth magnet faces the second portion of the first coil such that a magnetic field generated by the fourth magnet comprises a component parallel to the support frame and perpendicular to a current flowing through the second portion of the first coil at the location of the second portion of the first coil such that a Lorentz force is generated when an electrical current is applied to the first coil that pushes the fourth magnet away from the second portion of the first coil or pulls the fourth magnet towards the second portion of the first coil depending on the direction of the electrical current in the second portion of the first coil.

Furthermore, according to an embodiment, the second magnet faces the first portion of the second coil such that a magnetic field generated by the second magnet comprises a component parallel to the support frame and perpendicular to a current flowing through the first portion of the second coil at the location of the first portion of the second coil such that a Lorentz force is generated when an electrical current is applied to the second coil that pushes the second magnet away from the first portion of the second coil or pulls the second magnet towards the first portion of the second coil depending on the direction of the electrical current in the first portion of the second coil.

Furthermore, according to an embodiment, the third magnet faces the second portion of the second coil such that a magnetic field generated by the third magnet comprises a component parallel to the support frame and perpendicular to a current flowing through the second portion of the second coil at the location of the second portion of the second coil such that a Lorentz force is generated when an electrical current is applied to the second coil that pushes the third magnet away from the second portion of the second coil or pulls the third magnet towards the second portion of the second coil depending on the direction of the electrical current in the second portion of the second coil.

Furthermore, according to an alternative embodiment, instead of L-shaped coils, the first coil is an outer coil and the second coil is an inner coil, wherein the outer coil surrounds the inner coil, particularly with respect to a common extension plane of the inner and the outer coil (e.g. the inner and the outer coil may have parallel winding axes), and wherein the outer coil comprises a first section and an opposing second section, and wherein the inner coil comprises a first section and an opposing second section, wherein the first section of the outer coil extends adjacent the first section of the inner coil, and wherein the second section of the outer coil extends adjacent the second section of the inner coil.

Further, according to an embodiment, the outer coil comprises a third section connecting the first section of the outer coil to the second section of the outer coil, and wherein the inner coil comprises a third section extending adjacent the third section of the outer coil, wherein the third section of the inner coil connects the first section of the inner coil to the second section of the inner coil, and wherein the outer coil comprises a fourth section connecting the first section of the outer coil to the second section of the outer coil, and wherein the inner coil comprises a fourth section extending adjacent the fourth section of the outer coil, wherein the fourth section of the inner coil connects the first section of the inner coil to the second section of the inner coil.

Furthermore, according to an embodiment, the first sections of the outer and inner coil are integrated into the first arm of the support structure, wherein the second sections of the outer and inner coil are integrated into the second arm of the support structure, wherein the third sections of the outer and inner coil are integrated into the third arm of the support structure, and wherein the fourth sections of the outer and inner coil are integrated into the fourth arm of the support structure.

Further, according to an embodiment, the optical device comprises a third magnet connected to the first frame and a fourth magnet connected to the first frame, wherein the first magnet faces the first portions of the outer coil and the inner coil in a direction normal to a front side of the support structure (e.g. support frame), and wherein the second magnet faces the second portions of the outer and the inner coil in a direction normal to a front side of the support structure (e.g. support frame), and wherein the third magnet faces the third portions of the outer coil and the inner coil in a direction normal to a front side of the support structure (e.g. support frame), and wherein the fourth magnet faces the fourth portions of the outer and the inner coil in a direction normal to a front side of the support structure (e.g. support frame). Further, particularly. the third and the fourth magnet each comprise a magnetization that is oriented at an angle between 80° and 100° with respect to said plane.

Further, according to an embodiment, the first magnet comprises a first magnetization, and wherein the second magnet comprises a second magnetization, and wherein the third magnet comprises a third magnetization, and wherein the fourth magnet comprises a fourth magnetization, and wherein the respective magnetization extends orthogonal to the first plate, and wherein the first and the fourth magnetization point in the same direction while the second and the third magnetization point in the opposite direction.

Further, according to an embodiment, the first magnet faces the first portions of the outer and the inner coil and the fourth magnet faces the fourth portions of the outer and the inner coil such that a magnetic field generated by the first magnet comprises a component parallel to the support frame and perpendicular to a current flowing through the first portion of the outer coil and an opposite current flowing through the first portion of the inner coil and such that a magnetic field generated by the fourth magnet comprises a component parallel to the support frame and perpendicular to a current flowing through the fourth portion of the outer coil and an opposite current flowing through the fourth portion of the inner coil such that a resultant Lorentz force is generated that pushes the first magnet away from the first portions of the outer and the inner coil and the fourth magnet from the fourth portions of the outer and the inner coil or that pulls the first magnet towards the first portions of the outer and the inner coil and the fourth magnet towards the fourth portions of the outer and the inner coil; and/or that the third magnet faces the third portions of the outer and the inner coil and the second magnet faces the second portions of the outer and the inner coil such that a magnetic field generated by the third magnet comprises a component parallel to the support frame and perpendicular to a current flowing through the third portion of the outer coil and an opposite current flowing through the third portion of the inner coil and such that a magnetic field generated by the second magnet comprises a component parallel to the support frame and perpendicular to a current flowing through the second portion of the outer coil and an opposite current flowing through the second portion of the inner coil such that a resultant Lorentz force is generated that pushes the third magnet away from the third portions of the outer and the inner coil and the second magnet from the second portions of the outer and the inner coil or that pulls the third magnet towards the third portions of the outer and the inner coil and the second magnet towards the second portions of the outer and the inner coil.

Further, in an embodiment, the optical device comprises a transparent second plate for refracting the light beam when the light beam passes through said second plate, wherein the first plate faces the second plate, and wherein the support frame is configured to support the second plate.

Particularly, the two plates may also be substituted by a diffusor, respectively, wherein the first and the second diffusor can be tilted such that laser speckles can be reduced, i.e. due to the different angles of the diffusors, overlapping speckle patterns are generated which help to reduce the laser speckles contrast overall.

Further, according to an embodiment, the optical device comprises a second spring structure connected to the back side of the support frame, wherein the second spring structure comprises a second frame to which the second plate is connected, wherein the second frame is tiltable about a second axis with respect to the support frame, and wherein the actuator is configured to tilt the second plate about the second axis by means of a Lorentz force.

Further, in an embodiment, the actuator comprises a third and a fourth coil, wherein each of the third and the fourth coil comprises multiple windings extending around a winding axis of the respective (third or fourth) coil that extends perpendicular to said plane, wherein the third and the fourth coil are integrated into the support structure (e.g. support frame), and wherein the actuator comprises a third magnet facing the third coil and a fourth magnet facing the fourth coil, and wherein the third and the fourth magnet are connected the second frame. Particularly, the third and the fourth magnet each comprise a magnetization that is oriented at an angle between 80° and 100° with respect to said plane.

Further, in an embodiment, the third coil is integrated into the third arm, and wherein the fourth coil is integrated into the fourth arm of the support frame (e.g. printed circuit board).

Further, in an embodiment, the second spring structure comprises a third holding member that is connected via a third torsion bar to the second frame, and wherein the second spring structure comprises a fourth holding member that is connected via a fourth torsion bar to the second frame, wherein the third holding member is connected to the first arm of the support frame on the back side of the support frame and wherein the fourth holding member is connected to the second arm of the support frame on the back side of the support frame.

Further, particularly, the third torsion bar and the fourth torsion bar are aligned with the second axis.

Furthermore, according to an embodiment, the respective magnet faces its associated coil such that a magnetic field generated by the respective magnet comprises a component parallel to the support frame and perpendicular to a current flowing through the respective coil at the location of the respective coil such that a Lorentz force is generated when an electrical current is applied to the respective coil that pushes the respective magnet away from the respective coil or pulls the respective magnet towards the respective coil depending on the direction of the electrical current in the respective coil.

Furthermore, according to an embodiment of the optical device, the magnetization of the first and the second magnet points in the same direction. Furthermore, particularly, the magnetization of the third and the fourth magnet points in the same direction.

Furthermore, according to an embodiment, the optical element is one of: a transparent first plate (see also above) for refracting a light beam when the light beam passes through said first plate, a diffusor, a mirror, a prism.

Further, in an embodiment, the optical device comprises a static diffusor that faces the optical element (particularly in case the optical element is a moveable or tiltable diffusor).

Further, according to an embodiment of the optical device, wherein the at least one elastic member is one of the following components or comprises one or more of the following components: an elastically deformable membrane (wherein particularly the membrane comprises a polymer or is formed out of a polymer), an elastically deformable string (90); an elastically deformable, particularly bendable, pillar.

Furthermore, according to yet another aspect of the present invention, an optical device, particularly for enhancing the resolution of an image (or for speckle pattern reduction), is disclosed, wherein the optical device comprises:

an optical element configured to interact with a light beam impinging on the optical element, a support frame (or support structure) configured to support the optical element, a (preferably monolithic) spring structure connected to the support frame, wherein the spring structure comprises a frame to which the optical element is connected, wherein the frame is moveable with respect to the support frame, and wherein the spring structure comprises a first holding member that is connected via a first spring element to the frame, and an actuator configured to move the frame with respect to the support frame by means of a Lorentz force.

Preferably, in an embodiment, the spring structure comprises a second holding member that is connected via a second spring element to the frame, and wherein the spring structure comprises a third holding member that is connected via a third spring element to the frame, and wherein the spring structure comprises a fourth holding member that is connected via a fourth spring element to the frame, and wherein the respective spring element comprises a curved or angled shape or portion. Particularly said curved shape or portion comprises at least one inflection point, Particularly, due to the elastic, preferably monolithic suspension, the frame of the spring structure does not comprise explicit rotational joints. Particularly, the optical device allows to move/tilt an optical element in the form of window, a mirror, a transparent plate, a lens, or a prism in two degrees of freedom, wherein due to the specific design the optical device is cost effective, can be formed as a flat device with a small height in the direction of the optical path, and can comprise a large aperture in relation to the device footprint. Furthermore, power demands of the actuator are low and a linear actuation is possible, i.e. an electrical current used by the actuator is proportional to a force generated by the actuator for moving/tilting the optical element. Furthermore, the force comprises a very small dependence on the position of the actuator in contrast to a reluctance actuator.

Furthermore, particularly, the actuation can be controlled in a simple manner (e.g. open loop, wherein particularly no calibration is needed).

Particularly, at the respective inflection point, the curvature of the respective spring element changes its sign, i.e. at the respective inflection point a left-curved portion of the respective spring element joins a right-curved portion of the spring element. Particularly, the fact that the respective spring element comprises at least one inflection point can mean that the respective spring element comprises an s-shape or a meandering shape.

Particularly, according to an embodiment, the support frame is formed by a printed circuit board (PCB) or comprises a PCB.

Particularly, in an embodiment, the support frame surrounds an opening of the support frame that extends from a front side of the support frame to a back side of the support frame so that light can pass the support frame.

Furthermore, according to an embodiment, the support frame comprises a first arm that opposes a second arm of the support frame, and wherein the first and the second arm are connected by a third and a fourth arm of the support frame to form the support frame.

Furthermore, according to an embodiment, the first and the third arm are joined at a first corner portion of the support frame, and wherein the third and the second arm are joined at a second corner portion of the support frame, and wherein the second and the fourth arm are joined at a third corner portion of the support frame, and wherein the fourth and the first arm are joined at a fourth corner portion of the support frame.

Furthermore, according to an embodiment, the first holding member is connected to the first corner portion of the support frame (e.g. on the front side of the support frame), and wherein the second holding member is connected to the second corner portion of the support frame (e.g. on the front side of the support frame), and wherein the third holding member is connected to the third corner portion of the support frame (e.g. on the front side of the support frame), and wherein the fourth holding member is connected to the fourth corner portion of the support frame (e.g. on the front side of the support frame).

Particularly, the respective corner portion forms a protrusion to which the respective holding member is connected.

Furthermore, according to an embodiment, the actuator comprises a first coil, a second coil, a third coil and a fourth coil, wherein said coils are integrated into the support frame, and wherein the actuator comprises a first magnet facing the first coil, a second magnet facing the second coil, a third magnet facing the third coil, and a fourth magnet facing the fourth coil, wherein the magnets are connected to the frame.

Furthermore, according to an embodiment, the first coil is integrated into the first arm of the support frame, and wherein the second coil is integrated into the second arm of the support frame, and wherein the third coil is integrated into the third arm of the support frame, and wherein the fourth coil is integrated into the fourth arm of the support frame (e.g. printed circuit board).

Furthermore, according to an embodiment, the first magnet comprises a first magnetization, and wherein the second magnet comprises a second magnetization, and wherein the third magnet comprises a third magnetization, and wherein the fourth magnet comprises a fourth magnetization, and wherein the respective magnetization extends orthogonal to the frame, and wherein particularly the first and the second magnetization point in opposite directions, and wherein particularly the third and the fourth magnetization point in the opposite direction.

Furthermore, according to an embodiment, the respective magnet faces the respective coil such that a magnetic field generated by the respective magnet comprises a component parallel to the support frame and perpendicular to a current flowing through the respective coil at the location of the respective coil such that a Lorentz force is generated when an electrical current is applied to the respective coil that pushes the respective magnet away from the respective coil or pulls the respective magnet towards the respective coil depending on the direction of the electrical current in the respective coil.

Furthermore, according to an embodiment, the actuator is configured to apply electrical currents to the opposing first and second coil so that the first magnet and the first coil attract one another and the second magnet and the second coil repel one another so that the frame and therewith the optical element is tilted about a first axis, or wherein the actuator is configured to apply electrical currents to the opposing first and second coil so that the first magnet and the first coil repel one another and the second magnet and the second coil attract one another so that the frame and therewith the optical element are tilted about the first axis in the opposite direction.

Furthermore, according to an embodiment, the actuator is configured to apply electrical currents to the opposing third and fourth coil so that the third magnet and the third coil attract one another and the fourth magnet and the fourth coil repel one another so that the frame and therewith the optical element is tilted about a second axis, or wherein the actuator is configured to apply electrical currents to the opposing third and fourth coil so that the third magnet and the third coil repel one another and the fourth magnet and the fourth coil attract one another so that the frame and therewith the optical element are tilted about the second axis in the opposite direction.

Furthermore, the currents in the coils can be such in such a way as to tilt the optical element around any axis that can be constituted by a linear combination of the tilt around the first axis and the tilt around the second axis. Particularly, this axis can be in a diagonal direction.

Furthermore, according to an embodiment, the optical element is one of: a transparent plate, particularly a transparent flat plate, a mirror, a lens, a prism, a diffusor.

Particularly, in case the optical element is a transparent plate, the optical element is configured to interact with a light beam impinging on the optical element, such that the light beam is refracted by the optical element. Here the optical device can be used to enhance the resolution of an image as described above.

Furthermore, according to an embodiment, the optical device comprises a static diffusor that faces the optical element.

Particularly, in all embodiments/aspects of the present invention described herein, the optical device can comprise an energy source for generating the respective electrical current applied to the respective coil of the actuator, and a control unit for controlling the respective electrical current and therewith the movement of the movable structure along the first motion direction and/or along the second motion direction, wherein particularly the respective electrical current is a current pulse or comprises current pulses.

Furthermore, in this regard, the optical device may also comprise at least one sensor, particularly a Hall sensor, for measuring an actual position of the optical element, wherein the control unit is configured to control the respective current such that the measured actual position reaches a pre-defined reference position.

According to a further aspect of the present invention, an optical device, particularly for reducing speckle noise, is disclosed comprising:
- a movable diffusor for diffusing a light beam passing through said diffuser,
- a support structure for supporting the diffusor,
- wherein the movable diffusor is supported on the support structure by at least one elastically deformable member comprising particularly a polymer or a metal (or being formed out of a polymer or a metal) such that the diffusor is movable along a first motion direction extending along the support structure and/or along a second motion direction extending along the support structure. Particularly, the polymer can be one of: an elastomer, a silicone, a rubber. This also applies to the polymers used in the embodiments described in the following.

Furthermore, according to an embodiment of the optical device, the at least one elastically deformable member is an elastically deformable membrane that particularly comprises a polymer or is formed out of a polymer.

Furthermore, according to an embodiment of the optical device, the membrane comprises a circumferential edge region that is connected to the support structure.

Furthermore, according to an embodiment of the optical device, the diffusor is connected to a front side of the membrane, particularly via a spacer or a holding element connecting the movable diffusor to the membrane, wherein the front side of the membrane faces away from the support structure.

Furthermore, according to an embodiment of the optical device, the diffusor is arranged on a back side of the membrane, wherein the back side of the membrane faces the support structure.

Furthermore, according to an embodiment of the optical device, the diffusor is supported on the support structure by at least two elastically deformable members, wherein each elastically deformable member comprises a polymer or a metal (or is formed out of a polymer or a metal) such that the diffusor is movable along the first motion direction and/or along the second motion direction.

Furthermore, according to an embodiment of the optical device, the diffusor is supported on the support structure by three or four elastically deformable members, wherein each elastically deformable member comprises a polymer or a metal (or is formed out of a polymer or a metal) such that the diffusor is movable along the first motion direction and/or along the second motion direction. Particularly, the elastically deformable members are configured such that the diffusor can be moved parallel to the support structure.

Furthermore, according to an embodiment of the optical device, the respective elastically deformable member is an elastically deformable string comprising a polymer or being formed out of a polymer, wherein particularly the two strings extend parallel to one another along the support structure and are preferably integrally formed with two opposing fastening portions, via which fastening portions the two strings are fastened to the support structure, particularly to a substrate (e.g. printed circuit board) into which a coil assembly (e.g. first and/or second coil assembly) can be integrated.

Furthermore, according to an embodiment of the optical device, the diffusor is connected to the back side of the respective string, which back side faces the support structure.

Furthermore, according to an embodiment of the optical device, the respective string comprises a first end section and an opposing second end section, wherein the end sections are connected to the support structure.

Furthermore, according to an embodiment of the optical device, the respective elastically deformable member is an elastically deformable, particularly bendable pillar protruding from the support structure. Particularly, the pillars are bendable such that the diffusor can be moved parallel to the support structure.

Furthermore, according to an embodiment of the optical device, each polymer pillar is connected to a corner region of the diffusor or to a holding member, wherein the diffusor is connected to the holding member.

Furthermore, according to an embodiment of the optical device, the support structure delimits at least one recess or delimits at least one through-opening extending from a front side of the support structure to a back side of the support structure, wherein particularly said membrane extends over said through-opening.

Furthermore, according to an embodiment, the diffusor or said at least one holding element is arranged in front of said at least one recess or through-opening (e.g. on the front side of the support structure), particularly such that light can pass through the diffusor and through the support structure via said opening.

Furthermore, according to an embodiment, the diffusor forms a cantilever (and particularly protrudes beyond the support structure in a first direction and/or beyond the support structure in an opposite second direction). Further, particularly, the diffusor is connected to the front side of the membrane via a spacer.

Furthermore, according to an embodiment of the optical device, the optical device comprises a static diffusor that faces the movable diffusor. Particularly, the static diffusor can be at least one of: arranged in said at least one through-opening, arranged in front of said at least one through-opening, connected to a back side of the support structure, formed as a cantilever (wherein particularly the static diffusor protrudes beyond the support structure in said first direction and/or beyond the support structure in said opposite second direction).

Furthermore, according to an embodiment of the optical device, the optical device comprises an actuator for moving the diffusor along the first motion direction, and/or along the second motion direction, wherein the actuator comprises at least a first coil assembly connected to the support structure and at least a first magnet connected to the at least one elastically deformable member (particularly membrane) and/or to the movable diffusor such that the at least one first magnet faces the at least one first coil assembly.

Further, according to an embodiment, the first coil assembly comprises a first layer comprising a first and a second coil arranged side by side so that a section of the first coil extends along an adjacent section of the second coil, wherein particularly the first and the second coil are configured such that an electrical current that flows through the first and through the second coil flows in the same direction in said adjacent sections, and wherein the first coil assembly comprises a second layer, wherein the first and the second layer are arranged on top of one another, and wherein the second layer comprises a third and a fourth coil arranged side by side so that a section of the third coil extends along an adjacent section of the fourth coil, wherein particularly the third and the fourth coil are configured such that an electrical current that flows through the third and the fourth coil flows in the same direction in said section of the third coil and in said adjacent section of the fourth coil, and wherein, in a crossing region of the first coil assembly, the section of the first coil and the section of the second coil each cross the section of the third coil and the section of the fourth coil, wherein particularly the at least one first magnet faces said crossing region.

Further, according to an embodiment, the actuator comprises a second coil assembly opposing the first coil assembly, wherein the second coil assembly is connected to the support structure, and wherein the actuator comprises a second magnet connected to the at least one elastically deformable member (particularly membrane) and/or to the movable diffuser such that the second magnet faces the second coil assembly.

Further, according to an embodiment, the second coil assembly comprises a first layer comprising a first and a second coil arranged side by side so that a section of the first coil of the second coil assembly extends along an adjacent section of the second coil of the second coil assembly, wherein particularly the first and the second coil of the second coil assembly are configured such that an electrical current that flows through the first and through the second coil of the second coil assembly flows through said adjacent sections of the second coil assembly in the same direction, and wherein the second coil assembly comprises a second layer, wherein the first and the second layer of the second coil assembly are arranged on top of one another, and wherein the second layer of the second coil assembly comprises a third and a fourth coil arranged side by side so that a section of the third coil of the second coil assembly extends along an adjacent section of the fourth coil of the second coil assembly, wherein particularly the third and the fourth coil of the second coil assembly are configured such that an electrical current that flows through the third and the fourth coil of the second coil assembly flows through said section of the third coil of the second coil assembly and through said adjacent section of the fourth coil of the second coil assembly in the same direction, and wherein, in a crossing region of the second coil assembly, the section of the first coil of the second coil assembly and the section of the second coil of the second coil assembly each cross the section of the third coil of the second coil assembly and the section of the fourth coil of the second coil assembly.

Further, according to an embodiment, the first magnet comprises a first magnetization that points towards or away from the crossing region of the first coil assembly, and/or wherein the second magnet comprises a second magnetization that points towards or away from the crossing region of the second coil assembly.

Particularly, the first magnetization is orthogonal to a front side of the first magnet, which front side faces the crossing region of the first coil assembly. Further, particularly, the second magnetization is orthogonal to a front side of the second magnet, which front side of the second magnet faces the crossing region of the second coil assembly. Particularly, the respective front side is quadrangular, particularly square.

Particularly, the first magnetization is preferably orthogonal to an electrical current flowing through one of the sections, in the crossing region of the first coil assembly (particularly when the diffusor extends parallel to the coils of the first coil assembly). Furthermore, particularly, the second magnetization is preferably orthogonal to a current flowing through one of the sections in the crossing region of the second coil assembly (particularly when the diffusor extends parallel to the coils of the second coil assembly).

Furthermore, particularly, said adjacent sections of the first and second coil of the first layer of the respective coil assembly extend along the second motion direction.

Furthermore, particularly, said adjacent sections of the third and fourth coil of the second layer of the respective coil assembly extend along the first motion direction Furthermore, according to an embodiment, the optical device is configured to apply an electrical current to the first and the second coil of the first layer of the at least one first coil assembly such that the electrical current flows in the same direction in said adjacent sections of the first layer of the at least one first coil assembly, and wherein particularly (optionally) the optical device is configured to also apply an electrical current to the first and the second coil of the first layer of the second coil assembly such that the electrical current flows in the same direction in said adjacent sections of the first layer of the second coil assembly, such that a Lorentz force is generated that moves the diffusor along the first motion direction, particularly depending on the direction of the current in said adjacent sections of the first layer of the first coil assembly and optionally in said adjacent sections of the first layer of the second coil assembly.

Further, according to an embodiment, the optical device is configured to apply an electrical current to the third and to the fourth coil of the second layer of the first coil assembly such that the electrical current flows in the same direction in said adjacent sections of the second layer of the first coil assembly, and wherein particularly (optionally) the optical device is configured to also apply an electrical current to the third and the fourth coil of the second layer of the second coil assembly such that the electrical current flows in the same direction in said adjacent sections of the second layer of the second coil assembly, such that a Lorentz force is generated that moves the diffusor along the second motion direction, particularly depending on the direction of the current in said adjacent sections of the second layer of the first coil assembly and optionally in said adjacent sections of the second layer of the second coil assembly.

Further, according to an embodiment, the support structure comprises or is formed as a substrate, particularly in form of a printed circuit board (PCB), wherein the at least one first coil assembly and/or the second coil assembly is/are integrated into the substrate (e.g. PCB).

Optionally, a soft-magnetic plate can be arranged on a back side of the support structure or of the substrate so that the support structure or the substrate is arranged between the soft-magnetic plate and the first and/or second magnet.

Furthermore, according to an embodiment, the support structure delimits at least a first through-opening extending from a front side of the support structure to a back side of the support structure, and a first recess (the first recess can form a second through-opening), wherein the diffusor is arranged in front of the first (e.g. central) through-opening, wherein the movable diffusor is supported on the support structure by the at least one elastically deformable member which is formed as a membrane (or an elastic deformable pin) that is connected to the support structure such that it extends in or over the first recess (e.g. second through-opening, see above), and wherein particularly the optical device comprises said least one first magnet that is connected to the at least one elastically deformable member (and arranged in front or in the second through-opening), and wherein particularly the optical device comprises at least one holding element, wherein particularly the diffusor is connected via the at least one holding element to the at least one first magnet (so as to hold the diffusor in front of the first through-opening of the support structure), and wherein the at least one magnet is arranged such it faces said at least one first coil assembly.

Particularly, the optical device can comprise a plurality of first recesses (or second through-openings), wherein each first recess (e.g. second through-opening) can be covered by the at least one elastically deformable member (e.g. membrane), wherein alternatively a separate elastically deformable member (e.g. membrane) comprising a polymer or being formed out of a polymer can be arranged in or over each first recess (e.g. second through-opening), wherein a magnet is arranged in front of or in the respective first recess (or second through-opening) and connected to the at least one membrane or the respective membrane, wherein each magnet is arranged in front of a coil assembly. Further, each magnet is connected via a holding element to the diffusor to hold the latter in front of the first through-opening. Further, particularly, the respective coil assembly can be designed as the at least one first coil assembly described above. The respective magnet is preferably configured as the at least one first magnet described above. Further, the first recesses (or second through-openings) can be arranged around the (e.g. central) first through-opening. Thus, with help of the actuator formed by the coil assemblies and the associated magnets, the diffusor is movable along a first motion direction extending along the support structure and/or along a second motion direction extending along the support structure.

Furthermore, according to an embodiment, the support structure delimits a first, a second and a third recess (e.g. in form of a through-opening extending from a front side of the support structure to a back side of the support structure, respectively), wherein the movable diffusor is arranged in front of a fourth recess of the support structure, and wherein the movable diffusor is supported on the support structure by the at least one elastically deformable member which is formed as a membrane that is connected to the support structure such that it covers said recesses (e.g. through-openings), and wherein particularly the at least one first magnet is connected to the at least one elastically deformable member and arranged in front of the first recess, and wherein particularly the optical device comprises a holding element, wherein particularly the diffusor is connected via the holding element to the at least one first magnet so as to hold the diffusor in front of the first recess of the support structure, and wherein particularly the holding element comprises a first arm that connects the at least one first magnet to a first protrusion of the holding element, wherein the first protrusion is supported on the membrane and arranged in front of the second recess, and wherein the holding element comprises a second arm that connects the at least one first magnet to a second protrusion of the holding element, wherein the second protrusion is supported on the membrane and arranged in front of the third recess, and wherein the diffusor is connected to the first and to the second arm, and wherein the at least one first magnet is arranged such it faces said at least one first coil assembly.

Particularly, the fourth recess is arranged in an edge region of the support structure. Further, particularly the optical device comprises a static diffusor which extends over the fourth recess on the back side of the support structure and faces the movable diffusor. Further, particularly, the first and the second arm are integrally connected to one another and enclose an acute angle.

Furthermore, according to an embodiment of the optical device, the optical device comprises slide bearings arranged on the back side of the elastically deformable membrane.

Furthermore, according to an embodiment of the optical device, the at least one first magnet and/or the second magnet is/are arranged on the back side of the membrane.

Furthermore, according to an embodiment of the optical device, the at least one first magnet and/or the second magnet of the actuator is/are connected to the diffusor.

Furthermore, according to an embodiment of the optical device, the at least one first magnet and/or the second magnet of the actuator is/are configured to slide on a front surface of the support structure.

Furthermore, according to an embodiment of the optical device, the at least one first magnet and/or the second magnet of the actuator is/are configured to slide on a ferro-fluid arranged on a front surface of the support structure. Particularly, ferro-fluids are colloidal liquids made of nanoscale ferromagnetic or ferrimagnetic particles suspended in a carrier fluid.

Furthermore, according to an embodiment of the optical device, the front surface is formed by a layer of the support structure, which layer is formed out of a glass or a non-magnetic metal.

According to yet another aspect of the present invention, an optical device, particularly for enhancing the resolution of an image, is disclosed, comprising: a transparent plate for refracting a light beam passing through said plate, wherein the plate is tiltable (e.g. about a first axis and a second axis), and wherein the plate comprises a first end section and an opposing second end section, wherein the optical device comprises a first spring structure and an opposing second spring structure, wherein the first spring structure comprises an elongated first holding arm connected (particularly glued) to the first end section of the plate, and wherein the second spring structure comprises an elongated second holding arm connected (particularly glued) to the second end section of the plate, and wherein the first holding arm is connected via a first bar to a first bendable member of the first spring structure and via a second bar to a second bendable member of the first spring structure, and wherein the second holding arm is connected via a third bar to a third bendable member of the second spring structure and via a fourth bar to a fourth bendable member of the second spring structure.

Furthermore, according to an embodiment of the optical device, the respective bar is integrally connected to the associated bendable portion.

Furthermore, according to an embodiment of the optical device, the first bendable member comprises a top portion and a pillar extending perpendicular to the top portion of the first bendable member, wherein the pillar of the first bendable member connects the top portion of the first bendable member to a bottom portion of the first spring structure, and wherein the second bendable member comprises a top portion and a pillar extending perpendicular to the top portion of the second bendable member, wherein the pillar of the second bendable member connects the top portion of the second bendable member to the bottom portion of the first spring structure, and wherein the third bendable member comprises a top portion and a pillar extending perpendicular to the top portion of the third bendable member, wherein the pillar of the third bendable member connects the top portion of the third bendable member to a bottom portion of the second spring structure, and wherein the fourth bendable member comprises a top portion and a pillar extending perpendicular to the top portion of the fourth bendable member, wherein the pillar of the fourth bendable member connects the top portion of the fourth bendable member to the bottom portion of the second spring structure.

Furthermore, according to an embodiment of the optical device, the optical device comprises an actuator for tilting the plate, wherein the actuator comprises a first and a second coil arranged on the bottom portion of the first spring structure such that the top portion of the first bendable member faces the first coil and forms a first air gap with the first coil, and such that the top portion of the second bendable member faces the second coil and forms a second air gap with the second coil, and wherein the actuator comprises a third and a fourth coil arranged on the bottom portion of the second spring structure such that the top portion of the third bendable member faces the third coil and forms a third air gap with the third coil, and such that the top portion of the fourth bendable member faces the fourth coil and forms a fourth air gap with the fourth coil.

Furthermore, according to an embodiment of the optical device, the first spring structure is configured to guide magnetic flux generated by the first or second coil (when an electrical current is applied to the first or second coil), and wherein the second spring structure is configured to guide magnetic flux generated by the third or fourth coil (when an electrical current is applied to the third or fourth coil).

Furthermore, according to an embodiment of the optical device, the optical device is configured to apply an electrical current to the respective coil such that the respective coil attracts the top portion of the associated bendable portion due to a reluctance force generated by the respective coil of the actuator.

Furthermore, according to an embodiment of the optical device, the optical device is configured to apply an electrical current to the first and to the second coil or to the third and to the fourth coil to tilt the plate about a first axis extending parallel to the holding arms.

Furthermore, according to an embodiment of the optical device, the optical device is configured to apply an electrical current to the first and to the third coil or to the second and to the fourth coil to tilt the plate about a second axis extending perpendicular to the holding arms.

Furthermore, according to an embodiment of the optical device, the respective coil comprises a coil core extending perpendicular to the top portion of the respective bendable member.

Furthermore, according to an embodiment of the optical device, the actuator comprises a first substrate, wherein the first and the second coil are integrated into the first substrate (the first substrate can e.g. be a printed circuit board), and wherein the actuator comprises a second substrate, wherein the third and the fourth coil are integrated into the second substrate (the second substrate can e.g. be a printed circuit board).

Furthermore, according to an embodiment of the optical device, the first spring structure comprises a first latching arm for engaging with the first substrate of the actuator, wherein the first latching arm protrudes from the bottom portion of the first spring structure between the first and the second bendable member of the first spring structure and is configured to fasten the first substrate to the bottom portion of the first spring structure. Further, according to an embodiment, the second spring structure comprises a second latching arm for engaging with the second substrate of the actuator, wherein the second latching arm protrudes from the bottom portion of the second spring structure between the third and the fourth bendable member of the second spring structure and is configured to fasten the second substrate to the bottom portion of the second spring structure.

According to yet another aspect of the present invention, an optical device, particularly for enhancing the resolution of an image or for reducing speckle noise is disclosed, comprising: a movable structure comprising an optical region for interacting with a light beam passing through said optical region, a support structure for supporting the movable structure, the movable structure is supported on the support structure via balls such that the movable structure is movable along a first motion direction extending along the support structure.

Particularly, in an embodiment, the movable structure is supported on the support structure via balls such that the movable structure is movable along the support structure in a second motion direction extending along the support structure.

Particularly, in an embodiment, each ball engages with an associated recess of the support structure.

Particularly, in an embodiment, each ball engages with an associated recess of the movable structure.

Particularly, in an embodiment, the optical region for interacting with a light beam passing through said optical region is a transparent region for refracting a light beam passing through said transparent region.

Particularly, in an embodiment, the movable structure is supported on the support structure via said balls such that the movable structure is movable along a first motion direction extending along the support structure, and such that the movable structure is tilted about a first axis with respect to the support structure when the movable structure moves in the first motion direction.

Particularly, in an embodiment, the movable structure is supported on the support structure via said balls such that the movable structure is movable along the support structure in a second motion direction extending along the support structure and such that the movable structure is tilted about a second axis with respect to the support structure when the movable structure moves in the second motion direction.

Particularly, in an embodiment, the respective recess of the support structure comprises a bottom for contacting the ball engaging with the respective recess of the support structure, wherein the bottom comprises a slope.

Particularly, in an embodiment, the respective recess of the movable structure comprises a bottom for contacting the ball engaging with the respective recess of the movable structure, wherein the bottom of the respective recess of the movable structure comprises a slope.

Furthermore, the respective optical device described herein can be configured to be glued into an optical system (e.g. to form a component of the latter. Furthermore, the respective optical device described herein can also be configured to be slid into an optical system, using e.g. the support frame (particularly the printed circuit board) as a guiding structure for said sliding.

FIG. 1(A) shows in conjunction with FIGS. 1(B) and 1(C) an embodiment of an optical device 1 according to the present invention, wherein the optical device 1 is particularly configured for enhancing the resolution of an image (by shifting pixels as described herein). Particularly, the optical element 21 (e.g. transparent plate 21, particularly a glass) is configured for interacting with a light beam L passing through said plate 21 so that the light beam L gets refracted when passing through said transparent plate 21. In case the light beam L projects an image comprised of rows and columns of pixels and the plate 22 is tilted between a first and a second position (e.g. about a first axis A), the light beam L is shifted (e.g. said projected image is shifted by a fraction of a pixel (usually by a half of a pixel) along a first direction). In addition, the light beam L may also be shifted by tilting the plate 21 about a further (e.g. orthogonal) axis (not shown in FIG. 1) so that the light beam L is also shifted along a second direction.

Furthermore, using such a device 1, a temporal sequence of frames can be split into two sub-frames, wherein to successive sub-frames may be displaced with respect to each other by a fraction of a pixel (e.g. one-half or one-third). The sub-frames are projected in a sufficiently fast manner so that they appear to the human eye as if they are being projected simultaneously and superimposed. For instance, in case the sub-frames are aligned such that the corners of the pixels in one sub-frame are projected on the centers of the next sub-frame and so on, the illusion of a resolution can be achieved that seems twice as high. These kind of pixel shifting can be performed in one dimension (e.g. shifting in x-direction), but may also be performed in two dimensions (2D), e.g. shifting in x- as well as in y-direction of the image (i.e. shifting along the rows and columns of the digital image or shifting the pixel diagonally).

However, the device shown in FIG. 1 may also be used to reduce a so called speckle pattern, which is an interference pattern that is created on a screen (objective speckles) or the retina of the human eye (subjective speckles) due to the high coherency of the laser light.

The reduction of such a Speckle pattern can be accomplished by letting the light or laser beam pass through or reflect on an optical element 21 in form of a moving/oscillating diffuser. In case the frequency is high enough, the human brain integrates the perceived light over time which reduces the perceived speckle noise significantly.

Particularly, the device shown in FIG. 1 preferably comprises a transparent first plate 21 for refracting a light beam L when the light beam passes through said first plate 21, a support frame or structure 3 configured to support the first plate 21, wherein the support frame 3 surrounds an opening 31 of the support frame 3 that extends from a front side 3a of the support frame 3 to a back side 3b of the support frame 3 so that light can pass the support frame 3, a first spring structure 600 connected to the front side 3a of the support frame 3, wherein the first spring structure 600 comprises a first frame 607 to which the first plate 21 is connected, wherein the first frame 607 is tiltable about a first axis A with respect to the support frame 3, and an actuator 5 configured to tilt the first plate 21 about the first axis A by means of a Lorentz force, wherein the actuator 5 comprises a first coil 60 and a second coil 61, wherein said coils 60, 61 are integrated into the support frame 3, and wherein the actuator 5 comprises a first magnet 70 facing the first coil 60 and a second magnet 71 facing the second coil 61, wherein the first and the second magnet 70, 71 are connected to the first frame 607.

Figure 6:
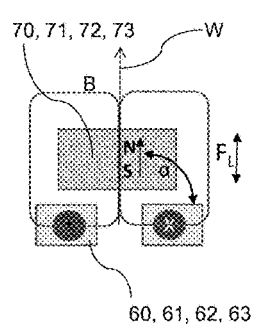
FIG. 6 shows a schematical cross sectional view of a detail of an actuator that can be used for tilting an optical element/transparent plate, wherein particularly the respective coil of the actuator is directly integrated in a printed circuit board, and wherein particularly the actuator uses a component of the magnetic field B of the respective magnet that is preferably perpendicular to the current in the respective coil and particularly perpendicular to the force $F_L$ generated by the actuator.

Particularly, the magnets 70, 71 each comprise a magnetization oriented at an angle α between 80° and 100° with respect to a plane that extends perpendicular to the winding axes W of said coils 60, 61 (cf. e.g. FIG. 6).

Particularly, the support frame 3 of the optical device 1 is formed by a printed circuit board, and preferably comprises a first arm 350 that opposes a second arm 351 of the support frame 3, wherein the first and the second arm 350, 351 are connected by a third and a fourth arm 352, 353 of the support frame 3.

Furthermore, the first spring structure 600 comprises a first holding member 602 that is connected via a first torsion bar 601 to the first frame 607, and a second holding member 604 that is connected via a second torsion bar 603 to the first frame 607, wherein the first holding member 602 is connected to the third arm 352 of the support frame 3 on the front side of the support frame 3, and wherein the second holding member 604 is connected to the fourth arm 353 of the support frame 3 on the front side of the support frame 3. Particularly, the first holding member 602 can be connected to a first overmold 300 protruding from the support frame 3 (e.g. printed circuit board). Likewise the second holding member 604 can be connected to a second overmold 301 protruding from the support frame 3.

As indicated in FIG. 1(C), the first torsion bar 601 and the second torsion bar 602 are aligned with the first axis A, about which the plate 21 can be tilted.

Further, particularly, the first holding member 602 is separated from the first frame 607 by two slots 605a, 605b that comprise a width that increases towards the first torsion bar. Furthermore, also the second holding member 604 can be separated from the first frame 607 by two slots 606a, 606b that comprise a width that increases towards the second torsion bar 603. Particularly, for controlled etching, portions of the slots on either side of the respective torsion bar 601, 603 can be symmetric as shown in FIG. 1(C).

Particularly, the optical element (e.g. glass) 21 can be tilted about the axis A that extends at an angle of 45° with respect to the third arm 352 of the support frame, i.e. diagonally across the first frame 607. Particularly, the tilt angle of the optical element 21 about axis A depends on pixel size and thickness of the optical element 21. The thickness can e.g. be in the range from 0.5 mm to 1 mm resulting in an tilt angle in the range of e.g. 0.4° to 1.5°.

Figure 3A:
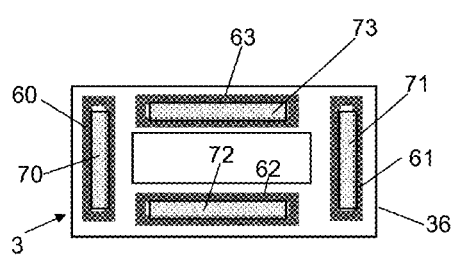
FIGS. 3A-3D show top views (FIG. 3A) and (FIG. 3B) of an embodiment of an actuator that can be used in conjunction with the embodiment of the device shown in FIG. 2A-2B, as well as top views (FIG. 3C) and (FIG. 3D) of an embodiment of an actuator that can be used in conjunction with the embodiment of the device shown in FIG. 1A-1C.
Figure 3B:
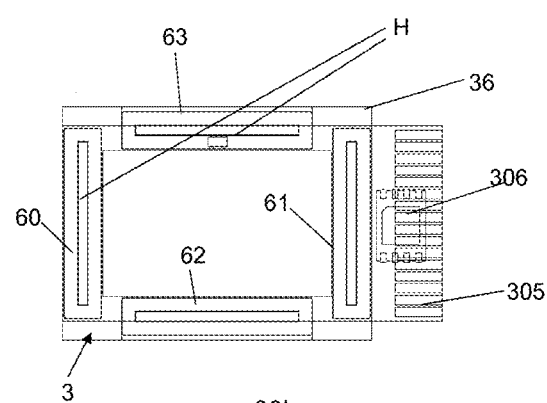
Figure 3C:
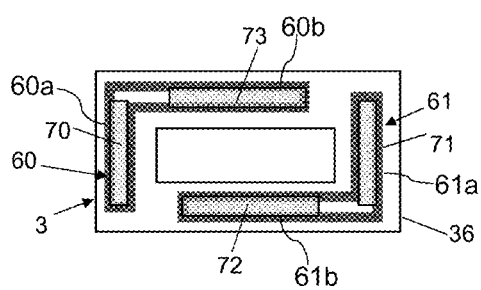
Figure 3D:
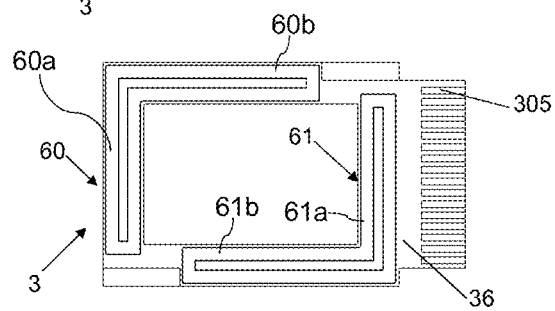

As further shown in FIGS. 1(A), 3(C) and 3(D), the first coil 60 is an L-shaped first coil 60 that comprises a first portion 60a that is integrated into the first arm 351 of the support frame 3 and a second portion 60b that runs perpendicular to the first portion 60a of the first coil 60, wherein the second portion 60b of the first coil 60 is integrated into the fourth arm 353 of the support frame 3, and wherein the second coil 61 is an L-shaped second coil 61 that comprises a first portion 61a that is integrated into the second arm 351 of the support frame 3 and a second portion 61b that runs perpendicular to the first portion 61a of the second coil 61, wherein the second portion 61b of the second coil 61 is integrated into the third arm 352 of the support frame 3.

Furthermore, the optical device 1 comprises a third magnet 72 facing the second coil 61 and a fourth magnet 73 facing the first coil 60, wherein the third and the fourth magnet 72, 73 are connected to the first frame 607, and wherein the first magnet 70 faces the first portion 60a of the first coil 60, and wherein the second magnet 71 faces the first portion 61a of the second coil 61, and wherein the third magnet 72 faces the second portion 61b of the second coil 61, and wherein the fourth magnet 73 faces the second portion 60b of the first coil 61. Particularly, the magnets 72, 73 can each comprise a magnetization M3, M4 oriented at an angle α between 80° and 100° with respect to said plane mentioned above (cf. e.g. FIG. 6).

Particularly, the first magnet 70 faces the first portion 60a of the first coil 60 such that a magnetic field B generated by the first magnet 70 comprises a component parallel to the support frame 3 and perpendicular to a current I flowing through the first portion 60a of the first coil 60 at the location of the first portion 60a of the first coil 60 such that a Lorentz force $F_L$ is generated when an electrical current I is applied to the first coil 60 that pushes the first magnet 70 away from the first portion 60a of the first coil 60 or pulls the first magnet 70 towards the first portion 60a of the first coil 60 depending on the direction of the electrical current I in the first portion 60a of the first coil 60 (cf. FIGS. 6 and 3(C)).

In a similar fashion the fourth magnet 73 faces the second portion 60b of the first coil 60 such that a magnetic field B generated by the fourth magnet 73 comprises a component parallel to the support frame 3 and perpendicular to a current I flowing through the second portion 60b of the first coil 60 at the location of the second portion 60b of the first coil 60 such that a Lorentz force $F_L$ is generated when an electrical current I is applied to the first coil 60 that pushes the fourth magnet 73 away from the second portion 60b of the first coil 60 or pulls the fourth magnet 73 towards the second portion 60b of the first coil 60 depending on the direction of the electrical current I in the second portion 60b of the first coil 60 (cf. FIGS. 6 and 26(C)).

Furthermore, analogously, the second magnet 71 faces the first portion 61a of the second coil 61 such that a magnetic field B generated by the second magnet 71 comprises a component parallel to the support frame 3 and perpendicular to a current I flowing through the first portion 61a of the second coil 61 at the location of the first portion 61a of the second coil 61 such that a Lorentz force $F_L$ is generated when an electrical current I is applied to the second coil 61 that pushes the second magnet 71 away from the first portion 61a of the second coil 61 or pulls the second magnet 71 towards the first portion 61a of the second coil 61 depending on the direction of the electrical current I in the first portion 61a of the second coil 61 (cf. FIGS. 6 and 3(C)).

Finally, the third magnet 72 faces the second portion 61b of the second coil 61 such that a magnetic field B generated by the third magnet 72 comprises a component parallel to the support frame 3 and perpendicular to a current I flowing through the second portion 61b of the second coil 61 at the location of the second portion 61b of the second coil 61 such that a Lorentz force $F_L$ is generated when an electrical current I is applied to the second coil 61 that pushes the third magnet 72 away from the second portion 61b of the second coil 61 or pulls the third magnet 72 towards the second portion 61b of the second coil 61 depending on the direction of the electrical current I in the second portion 61b of the second coil 61.

Thus, by controlling the electrical currents applied to the first and to the second coil, the plate 21 can be tilted about the axis A shown in FIG. 1(C).

Further, optionally the device 1 can comprise a static diffusor 211 (e.g. in case the optical element 21 is a diffusor), wherein the static diffusor faces the optical element 21/diffusor 21. Such a static diffusor 211 may also be used in other embodiments (e.g. FIG. 5).

Furthermore, the optical device 1 may also comprise a Hall sensor H or another sensor H to measure a position of the first spring structure 600. Electrical contacts 305 for electrically contacting the device 1 can be arranged on one of the arms of the support frame 3, e.g. on the first arm 350 or on the second arm 351. As indicated in FIG. 3(D) the support frame (e.g. printed circuit board 36) can comprise a flexible part comprising the contacts 305 for the electrical connections to the device 1. However, such contacts 305 can in general be provided also on other locations of the device 1.

Furthermore, FIG. 2 shows a modification of the embodiment of the optical device 1 shown in FIG. 1, wherein here (in addition to the components shown in FIG. 1), the optical device 1 comprises a transparent second plate 210 for refracting the light beam L when the light beam L passes through said second plate 210, wherein the first plate 21 faces the second plate 210, and wherein the support frame 3 is configured to support the second plate 210.

Particularly, the optical device 1 comprises a second spring structure 700 connected to the back side 3b of the support frame 3, wherein the second spring structure 700 comprises a second frame to which the second plate 210 is connected, wherein the second frame 707 is tiltable about a second axis A' with respect to the support frame 3, and wherein the actuator 5 is configured to tilt the second plate 210 about the second axis A' by means of a Lorentz force.

To this end, the actuator 5 comprises a third 62 and a fourth coil 63, wherein the third and the fourth coil 62, 63 are integrated into the support frame 3, and wherein the actuator comprises a third magnet 72 facing the third coil 63 and a fourth magnet 73 facing the fourth coil 63, and wherein the third and the fourth magnet 73, 74 are connected to the second frame 707.

Particularly, in contrast to FIG. 1, the first and the second coil 60, 61 do not comprise an L-shape but are arranged according to FIGS. 3(A) and 3(B), wherein the first coil 61 is integrated into the first arm 350 of the support frame 3 and the second coil is integrated into the opposing second arm 351 of the support frame 3.

In a similar fashion, the third coil 62 is integrated into the third arm 352, and the fourth coil 63 is integrated into the fourth arm 353 of the support frame 3 (e.g. printed circuit board). Particularly, the first coil 60 and the second coil 61 can be electrically connected for push pull action on the axis A. Furthermore, the third coil 62 and the fourth coil 63 can be electrically connected for push pull action on the axis A'.

Furthermore, as indicated in FIG. 3(B), one or more electronic components 306 of the device 1 can be arranged on the support frame 3, e.g. on one of the arms (e.g. second arm 351). Particularly, the respective electronic component 306 is arranged in the vicinity of the electrical contacts 305 (e.g. on the second arm 351). Optionally, the device can comprise a Hall sensor H for each frame 607, 707 for measuring the position of the corresponding frame 607, 707, particularly of the respective optical element 21, 210.

Figure 2B:
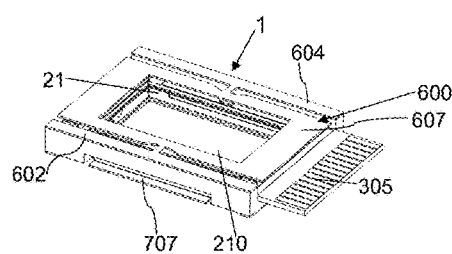

Furthermore, as shown in FIGS. 2(A) and 2(B), the second spring structure 700 comprises a third holding member 702 that is connected via a third torsion bar 701 to the second frame 707, and wherein the second spring structure 700 comprises a fourth holding member 704 that is connected via a fourth torsion bar 703 to the second frame 707, wherein the third holding member 702 is connected to the first arm 350 of the support frame 3 on the back side 3b of the support frame 3, and wherein the fourth holding member 704 is connected to the second arm 351 of the support frame 3 on the back side 3b of the support frame 3. Also here, the respective holding member 604, 602, 702, 704 can each be connected to an associated overmold 300, 301, 302, 303 protruding from the support frame 3 (e.g. printed circuit board). Also here, electrical contacts 305 for electrically contacting the device 1 can be arranged on one of the arms of the support frame 3, e.g. on the second arm 351.

Particularly, the third torsion bar 701 and the fourth torsion bar 703 are aligned with the second axis A' as shown in FIG. 2(A).

Furthermore, the respective magnet 70, 71, 72, 73 faces the respective coil 60, 61, 62, 63 (cf. also FIG. 6) such that a magnetic field B generated by the respective magnet 70, 71, 72, 73 comprises a component parallel to the support frame 3 and perpendicular to a current I flowing through the respective coil 60, 61, 62, 63 at the location of the respective coil 60, 61, 62, 63 such that a Lorentz force is generated when an electrical current is applied to the respective coil 60, 61, 62, 63 that pushes the respective magnet 70, 71, 72, 73 away from the respective coil 60, 61, 62, 63 or pulls the respective magnet 70, 71, 72, 73 towards the respective coil 60, 61, 62, 63 depending on the direction of the electrical current I in the respective coil 60, 61, 62, 63. This allows to tilt the first frame 607 and therewith the first plate 21 about the first axis A and the second frame 707 and therewith the second plate 210 about the orthogonal second axis A'.

Also here, the tilt angle about the respective axis A, A' depends on the pixel size and thickness of the respective optical element 21, 210. Particularly, the respective thickness can be in the range from 0.5 mm to 1 mm resulting in a respective tilt angle in the range from e.g. 0.4° to 1.5°.

Figure 4:
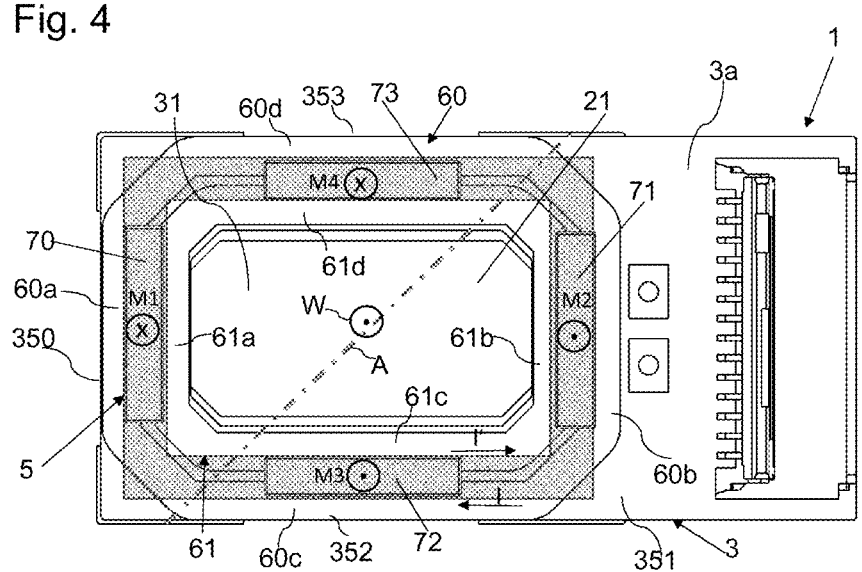
FIG. 4 shows a top view of a further embodiment of an actuator that can be used with the device shown in FIG. 1.

FIG. 4 shows a further arrangement of coils 60, 61 that can be used with the embodiment of the optical device 1 shown in FIG. 1(A) instead of the two L-shaped coils 60, 61.

According to FIG. 4, the first coil 60 is an outer coil 60 and the second coil 61 is an inner coil 61, wherein the outer coil 60 surrounds the inner coil 61, and wherein the outer coil 60 comprises a first section 60a and an opposing second section 60b, and wherein the inner coil 61 comprises a first section 61a and an opposing second section 61b, wherein the first section 60a of the outer coil 60 extends adjacent the first section 61a of the inner coil 60, and wherein the second section 60b of the outer coil 60 extends adjacent the second section 61b of the inner coil 61.

Furthermore, the outer coil 60 comprises a third section 60c connecting the first section 60a of the outer coil 60 to the second section 60b of the outer coil 60, and the inner coil 61 comprises a third section 61c extending adjacent the third section 60c of the outer coil 60, wherein the third section 61c of the inner coil 61 connects the first section 61a of the inner coil 61 to the second section 61b of the inner coil 60, and wherein the outer coil 60 comprises a fourth section 60d connecting the first section 60a of the outer coil 60 to the second section 60b of the outer coil 60, and wherein the inner coil 61 comprises a fourth section 61d extending adjacent the fourth section 60d of the outer coil 60, wherein the fourth section 61d of the inner coil 61 connects the first section 61a of the inner coil 61 to the second section 61b of the inner coil 61.

Furthermore, as shown in FIG. 4, the first sections 60a, 61a of the outer and inner coil 60, 61 are integrated into the first arm 350 of the support structure 3, and the second sections 60b, 61b of the outer and inner coil 60, 61 are integrated into the second arm 351 of the support structure 3. Further, the third sections 60c, 61c of the outer and inner coil 60, 61 are integrated into the third arm 352 of the support structure 3, and the fourth sections 60d, 61d of the outer and inner coil 60, 61 are integrated into the fourth arm 353 of the support structure 3.

Also here, the optical device 1 comprises magnets 70, 71, 72, 73 connected to the first frame 607 that are attracted or repelled by means of the coils 60, 61 to tilt the frame 607 and therewith the optical element 21 accordingly.

Particularly, the first magnet 70 faces the first portions 60a, 61a of the outer coil 60 and the inner coil 60, 61 in a direction normal to a front side 3a of the support frame 3, and the second magnet 71 faces the second portions 60b, 61b of the outer and the inner coil 60, 61 in a direction normal to the front side 3a of the support frame 3. Furthermore, the third magnet 72 faces the third portions 60c, 61c of the outer coil 60 and the inner coil 61 in a direction normal to the front side 3a of the support frame 3, and the fourth magnet faces 73 faces the fourth portions 60d, 61d of the outer and the inner coil 60, 61 in a direction normal to the front side 3a of the support frame 3.

Furthermore, each magnet 70, 71, 72, 73 comprises a magnetization M1, M2, M3, M4, wherein the respective magnetization M1, M2, M3, M4 extends orthogonal to the first plate 21, wherein the magnetization M1, M4 of the first and the fourth magnet 70, 73 point in the same direction while the magnetizations M2, M3 of the second and the third magnet 71, 72 point in the opposite direction.

Particularly, the first magnet 70 faces the first portions 60a, 61a of the outer and the inner coil 60, 61 and the fourth magnet 73 faces the fourth portions 60d, 61d of the outer and the inner coil 60, 61 such that a magnetic field B generated by the first magnet 70 comprises a component parallel to the support frame 3 and perpendicular to a current I flowing through the first portion 60a of the outer coil 60 and to an opposite current I' flowing through the first portion 61a of the inner coil 61, and such that a magnetic field B generated by the fourth magnet 73 comprises a component parallel to the support frame 3 and perpendicular to a current I flowing through the fourth portion 60d of the outer coil 60 and to an opposite current I' flowing through the fourth portion 61d of the inner coil 61 such that a resultant Lorentz force $F_L$ is generated that pushes the first magnet 70 away from the first portions 60a, 61a of the outer and the inner coil 60,61 and the fourth magnet 73 from the fourth portions 60d, 61d of the outer and the inner coil 60, 61 or that pulls the first magnet 70 towards the first portions 60a, 61a of the outer and the inner coil 60, 61 and the fourth magnet 73 towards the fourth portions 60d, 61d of the outer and the inner coil 60, 61.

In a similar manner, the third magnet 72 faces the third portions 60c, 61c of the outer and the inner coil 60, 61 and the second magnet 71 faces the second portions 60b, 61b of the outer and the inner coil 60, 61 such that a magnetic field B generated by the third magnet 72 comprises a component parallel to the support frame 3 and perpendicular to a current I flowing through the third portion 60c of the outer coil 60 and to an opposite current I' flowing through the third portion 61c of the inner coil 61 and such that a magnetic field B generated by the second magnet 71 comprises a component parallel to the support frame 3 and perpendicular to a current I flowing through the second portion 60b of the outer coil 60 and to an opposite current I' flowing through the second portion 61b of the inner coil 61 such that a resultant Lorentz force $F_L$ is generated that pushes the third magnet 72 away from the third portions 60c, 61c of the outer and the inner coil 60, 61 and the second magnet 71 from the second portions 60b, 61b of the outer and the inner coil 60, 61 or that pulls the third magnet 72 towards the third portions 60c, 61c of the outer and the inner coil 60, 61 and the second magnet 71 towards the second portions 60b, 61b of the outer and the inner coil 60, 61.

Figure 5A:
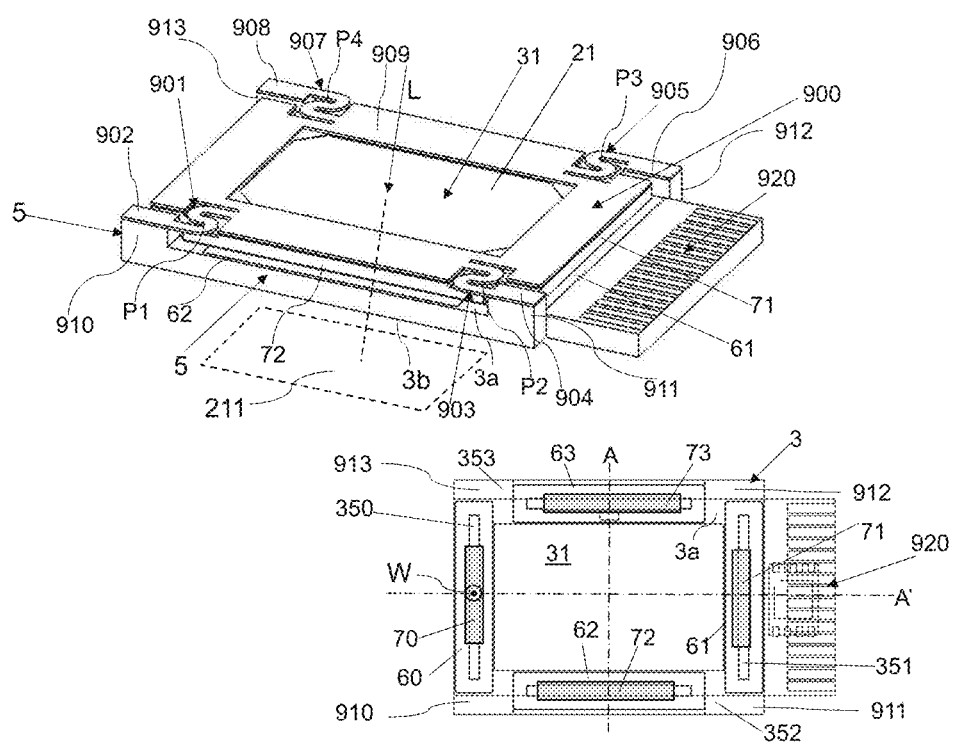
FIGS. 5A-5B show a perspective view (FIG. 5A) of a further embodiment of an optical device according to the present invention comprising a tiltable optical element supported through springs, wherein (FIG. 5B) shows a top view of an actuator of the device.

Furthermore, FIG. 5 shows yet another embodiment of an optical device 1 that is particularly configured for enhancing the resolution of an image and/or for reduction of speckle patterns. According to FIG. 5, the optical device 1 comprises at least an optical element 21 configured to interact with a light beam L impinging on the optical element 21, a support frame 3 configured to support the optical element 21, a preferably monolithic spring structure 900 connected to the support frame 3, wherein the spring structure 900 comprises a frame 909 to which the optical element 21 is connected, wherein the frame 909 is moveable with respect to the support frame 3, and wherein the spring structure 900 comprises a first holding member 902 that is connected via a first spring element 901 to the frame 909, and wherein the spring structure 900 comprises a second holding member 904 that is connected via a second spring element 903 to the frame 909, and wherein the spring structure 900 comprises a third holding member 906 that is connected via a third spring element 905 to the frame 909, and wherein the spring structure 900 comprises a fourth holding member 908 that is connected via a fourth spring element 907 to the frame 909.

Preferably, the monolithic spring structure 900 is formed out of a metal sheet. Furthermore, preferably, the respective spring element 901, 903, 905, 907 comprises a curved shape comprising at least one inflection point P1, P2, P3, P4.

Particularly, at the respective inflection point P1, P2, P3, P4, the curvature of the respective spring element 901, 903, 905, 907 changes its sign, i.e. at the respective inflection point P1, P2, P3, P4 a left-curved portion of the respective spring element 901, 903, 905, 907 joins a right-curved portion of the spring element 901, 903, 905, 907. Particularly, the respective spring element 901, 903, 905, 907 is curved in a manner that the respective spring element 901, 903, 905, 907 comprises two arc-shaped portions that are connected such that the respective spring element 901, 903, 905, 907 comprises an s-shape or a meandering shape as depicted in FIG. 5.

Further, the optical device 1 comprises an actuator 5 that is configured to move the frame 909 with respect to the support frame 3 by means of a Lorentz force.

According to a preferred embodiment, the support frame 3 is formed by a printed circuit board. Particularly, the support frame 3 preferably surrounds an opening 31 of the support frame 3 that extends from a front side 3a of the support frame 3 to a back side 3b of the support frame 3 so that light can pass the support frame 3.

Particularly, the support frame 3 comprises a first arm 350 that opposes a second arm 351 of the support frame 3, and wherein the first and the second arm 350, 351 are connected by a third and a fourth arm 352, 353 of the support frame 3.

Furthermore, the first and the third arm 350, 352 are joined at a first corner portion 910 of the support frame 3, and wherein the third and the second arm 352, 351 are joined at a second corner portion 911 of the support frame 3, and wherein the second and the fourth arm 351, 353 are joined at a third corner portion 912 of the support frame 3, and wherein the fourth and the first arm 353, 350 are joined at a fourth corner portion 913 of the support frame 3.

Now, for connecting the spring structure 900 to the support frame 3, the first holding member 902 is connected to the first corner portion 910 of the support frame 3, the second holding member 904 is connected to the second corner portion 911 of the support frame 3, the third holding member 906 is connected to the third corner portion 912 of the support frame 3, and the fourth holding member 908 is connected to the fourth corner portion 913 of the support frame 3.

Particularly, the respective corner portion 910, 911, 912, 913 forms a protrusion to which the respective holding member 902, 904, 906, 908 is connected.

For tilting the frame 909, the actuator 5 comprises a first coil 60, a second coil 61, a third coil 62 and a fourth coil 63, wherein said coils 60, 61, 62, 63 are preferably integrated into the support frame 3. Furthermore, the actuator 5 comprises a first magnet 70 facing the first coil 60, a second magnet 71 facing the second coil 61, a third magnet 72 facing the third coil 62, and a fourth magnet 73 facing the fourth coil 63, wherein the magnets 70, 71, 72, 73 are connected to the frame 909.

Particularly, each magnet 70, 71, 72, 73 comprises a magnetization M1, M2, M3, M4, wherein the respective magnetization M1, M2, M3, M4 extends orthogonal to the frame 909, wherein particularly the first and the second magnetization M1, M2 point in opposite directions (or in the same direction), and wherein particularly the third and the fourth magnetization M3, M4 point in opposite directions (or in the same direction).

Particularly, the first coil 60 is integrated into the first arm 350 of the support frame 3, the second coil 61 is integrated into the second arm 351 of the support frame 3, the third coil 62 is integrated into the third arm 352 of the support frame 3, and the fourth coil 63 is integrated into the fourth arm 353 of the support frame 3. Particularly, the support frame 3 can comprise or can be formed as a printed circuit board into which the coils 60, 61, 62, 63 are integrated.

Figure 5B:
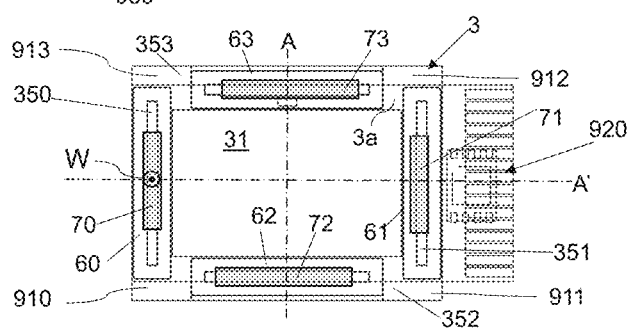

As shown in FIG. 5(B), the respective magnet 70, 71, 72, 73 faces the respective coil 60, 61, 62, 63 such that a magnetic field B generated by the respective magnet 70, 71, 72, 73 comprises a component parallel to the support frame 3 and perpendicular to a current I flowing through the respective coil 60, 61, 62, 63 at the location of the respective coil 60, 61, 62, 63 (cf. also FIG. 6) such that a Lorentz force is generated when an electrical current is applied to the respective coil 60, 61, 62, 63 that pushes the respective magnet 70, 71, 72, 73 away from the respective coil 60, 61, 62, 63 or pulls the respective magnet 70, 71, 72, 73 towards the respective coil 60, 61, 62, 63 depending on the direction of the electrical current I in the respective coil 60, 61, 62, 63.

Particularly, the actuator 5 is configured to apply electrical currents to the opposing first and second coil 60, 61 so that the first magnet 70 and the first coil 60 attract one another and the second magnet 71 and the second coil 61 repel one another so that the frame 909 and therewith the optical element 21 is tilted about a first axis A, or wherein the actuator 5 is configured to apply electrical currents to the opposing first and second coil 60, 61 so that the first magnet 70 and the first coil 60 repel one another and the second magnet 71 and the second coil 61 attract one another so that the frame 909 and therewith the optical element 21 are tilted about the first axis A in the opposite direction.

In the same fashion, the actuator 5 is preferably configured to apply electrical currents to the opposing third and fourth coil 62, 63 so that the third magnet 72 and the third coil 62 attract one another and the fourth magnet 73 and the fourth coil 63 repel one another so that the frame 909 and therewith the optical element 21 are tilted about a second axis A', or wherein the actuator 5 is configured to apply electrical currents to the opposing third and fourth coil 62, 63 so that the third magnet 72 and the third coil 62 repel one another and the fourth magnet 73 and the fourth coil 63 attract one another so that the frame 909 and therewith the optical element 21 are tilted about the second axis A' in the opposite direction.

As shown in FIG. 5, the optical element 21 is a flat transparent plate having plane-parallel surfaces. However, in other embodiments, the optical elements 21 can be one of: a mirror, a lens, a prism or any other optical element that shall be tilted about e.g. two independent axes A, A'.

In the following, relating to FIGS. 7 to 15, an aspect of the present invention is described in more detail, wherein the optical device 1 is preferably used for reducing speckle pattern (also referred to as speckle noise), wherein the device 1 comprises a movable diffusor 21 for diffusing a light beam L passing through said diffusor 21, and a support structure 3 for supporting the diffusor 21, wherein, as shown e.g. in FIG. 7, the movable diffusor 21 is supported on the support structure 3 by at least one elastically deformable member 90 comprising e.g. a polymer or e.g. a metal (or being formed out of a polymer or a metal) such that the diffusor 21 is movable along a first motion direction x extending along the support structure 3 and/or along a second motion direction y (perpendicular to the cross-sectional plane shown in FIG. 7) that also extends along the support structure 3.

Figure 7:
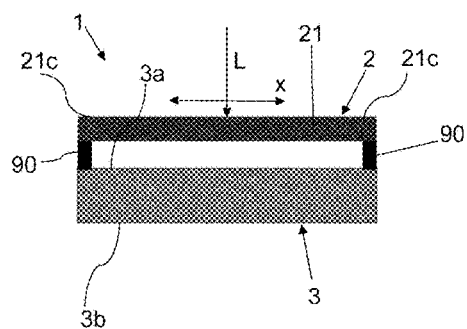
FIG. 7 shows a schematical cross-sectional view of a further embodiment of an optical device according to the present invention comprising a diffusor supported on elastic polymer pillars for achieving speckle pattern reduction.
Figure 11:
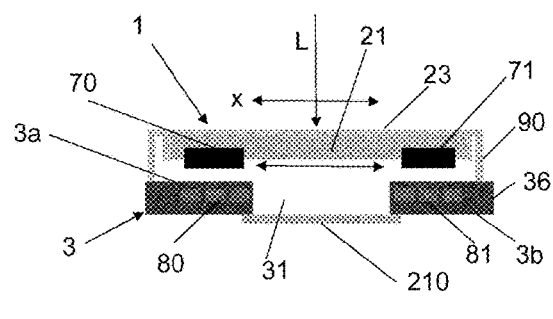
FIG. 11 shows a schematical cross-sectional view of a further embodiment of an optical device according to the present invention comprising a diffusor supported on elastic polymer pillars for achieving speckle pattern reduction.

As shown in FIGS. 7 and 11, the diffusor 21 can be supported on the support structure 3 by at least two elastically deformable members 90 that protrude from the support structure 3 (e.g. normal to a front side 3a of the support structure 3), wherein each elastically deformable member 90 comprises a polymer or a metal, or may be formed out of a polymer or a metal. Preferably, the diffusor 21 is supported on the support structure 3 by three or four such elastically deformable members 90.

Particularly, as shown in FIGS. 7 and 11, the respective elastically deformable member 90 is an elastically deformable, particularly bendable, pillar 90 protruding from the support structure 3 (e.g. from the front side 3a of the support structure 3). Particularly the pillars 90 can be configured so as to allow only lateral movement of the optical element/diffusor 21 (e.g. parallel to the support structure 3/along the extension plane of the diffusor 21).

Particularly, as shown in FIG. 7, each pillar 90 can be connected to a corner region 21c of the diffusor 21.

Alternatively, as shown in FIG. 11, the respective pillar 90 can be connected to a holding member 23, wherein the diffusor 21 is connected to the holding member 23.

In the embodiments shown in FIGS. 7 and 11, the respective support structures 3 can delimit a through-opening 31 (not visible in FIG. 7) extending from a front side 3a of the support structure 3 to a back side 3b of the support structure 3. Particularly, the respective diffusor 21 is arranged in front of said through-opening 31, so that light L can pass through the diffusor 21 and through the support structure 3 via said through-opening 31.

Furthermore, as shown in FIG. 11, the optical device 1 can also comprise a static diffusor 210 that faces the movable diffusor 21, wherein the static diffusor 210 can be arranged in front of or in said opening 31. Particularly, the static diffusor 210 can be connected to the back side 3b of the support structure 3.

For moving the diffusor 21 in the embodiments of the optical device 1 shown in FIGS. 7 and 11, an actuator can be used as described in conjunction with FIG. 13 (see below). Therefore, the optical device 1 preferably comprises a first and a second magnet 70, 71 that can be connected to the diffusor 21 as shown in FIG. 11. Furthermore, each magnet 70, 71 preferably faces an associated coil assembly 80, 81 connected to the support structure 3. Particularly, the respective coil assembly is integrated into the support structure, particularly into a printed circuit board 36 comprises by the support structure 3 or forming the support structure 3.

As an alternative to the pillars 90, the optical device 1 can also comprise an elastically deformable membrane 90 as e.g. shown in FIGS. 8, 9, 10 and 12. Also here, the membrane 90 can be configured so as to allow only lateral movement of the optical element/diffusor 21 (e.g. parallel to the support structure 3/along the extension plane of the diffusor 21).

Here, the optical device 1 for reducing speckle noise, particularly comprises a movable diffusor 21 for diffusing a light beam L passing through said diffusor 21, and, as before, a support structure 3 for supporting the diffusor 21, wherein the movable diffusor 21 is supported on the support structure 3 by at least one elastically deformable membrane 90 that e.g. comprises a polymer (or is formed out of a polymer) such that the diffusor 21 is movable along a first motion direction x extending along the support structure 3 and/or along a second motion direction y extending along the support structure (the second motion direction y extends perpendicular to the shown cross-sectional plane of FIGS. 8, 9, 10(A), and 12).

Figure 8:
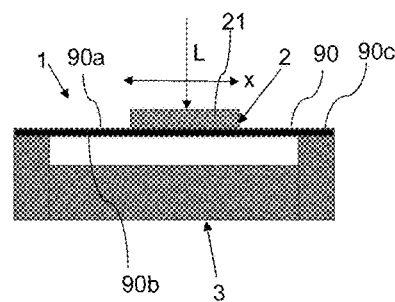
FIG. 8 shows a schematical cross-sectional view of a further embodiment of an optical device according to the present invention comprising a diffusor supported on an elastic membrane for achieving speckle pattern reduction.
Figure 9A:
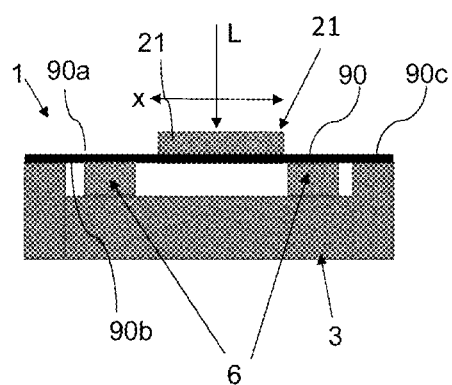
FIGS. 9A-9B show schematical cross-sectional views (FIG. 9A), (FIG. 9B) of further embodiments of an optical device according to the present invention comprising a diffusor supported on an elastic membrane for achieving speckle pattern reduction.
Figure 9B:
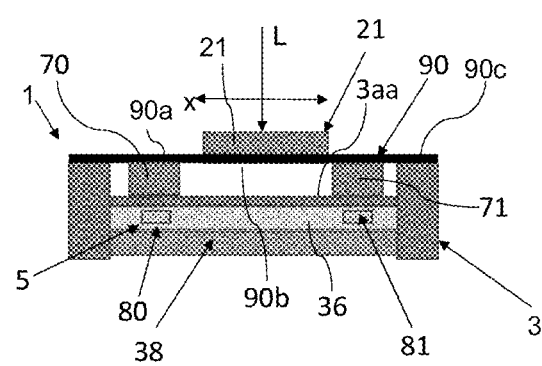
Figure 10A:
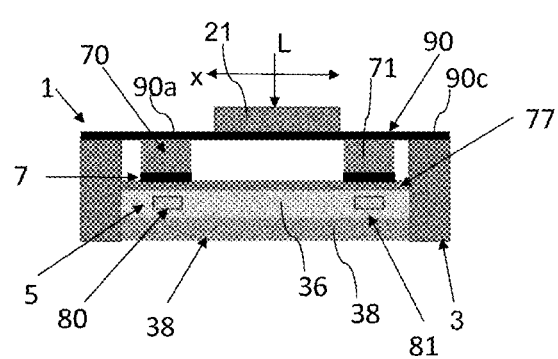
FIGS. 10A-10C show a schematical cross-sectional view (FIG. 10A) and a top view (FIG. 10B) of a further embodiment of an optical device according to the present invention comprising a diffusor supported on an elastic membrane for achieving speckle pattern reduction, as well as a top view (FIG. 10C) of an embodiment of an optical device according to the present invention comprising a diffusor supported on an elastic polymer string for achieving speckle pattern reduction.
Figure 10B:
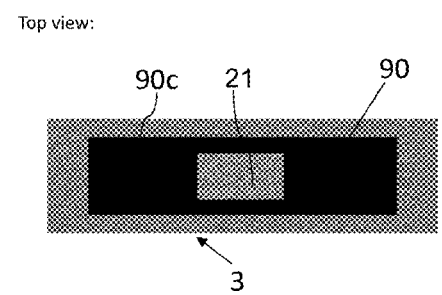
Figure 12:
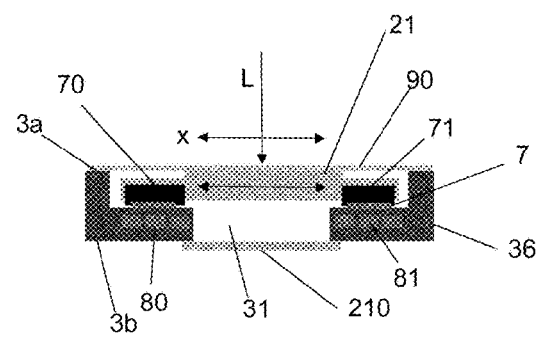
FIG. 12 shows a schematical cross-sectional view of a further embodiment of an optical device according to the present invention comprising a diffusor supported on elastic polymer pillars for achieving speckle pattern reduction.

Particularly, as shown in FIGS. 8, 9, 10(A), and 12, the membrane 90 can comprise a circumferential edge region 90c via which the membrane 90 is connected to the support structure 3 (cf. e.g. FIG. 10(B)). Furthermore, as indicated in FIGS. 8, 9, 10(A), the diffusor 21 can be connected to a front side 90a of the membrane 90, wherein the front side 90a of the membrane 90 faces away from the support structure (3). Alternatively, as shown in FIG. 12 for instance, the diffusor 21 can also be arranged on a back side 90b of the membrane 90, wherein the back side 90b of the membrane 90 faces the support structure 3.

Furthermore, as shown in FIG. 9(A), the optical device 1 can comprise slide bearings 6 that are connected to the back side 90b of the membrane 90, which slide bearings 6 can be configured to slide on the support structure 3. The slide bearings 6 can be sliding ruby discs. The slide bearings 6 can also be formed by the magnets that are then sliding directly on a surface of the device (e.g. a spacer glass).

Alternatively or in addition, a first and a second magnet 70, 71 of an actuator of the device 1 can be configured to slide on a front surface 3aa of the support structure 3 as shown in FIG. 9(B). Particularly, as shown in FIGS. 10(A) and 12, said magnets 70, 71 can be configured to slide on a ferro-fluid 7 arranged on a front surface 3aa of the support structure 3. Particularly, the respective front surface 3aa can be formed by a layer formed out of a glass or a non-magnetic metal. The ferro-fluid lubricant reduces friction and serves for position definition and potential vibration elimination. Furthermore, the ferro-fluid can increase the magnetic field of the actuator. Optionally, a thin glass or non-magnetic metal plate 77 can be arranged on the support structure 3 and above the coil assemblies 80, 81, particularly on the printed circuit board 36.

Also in the embodiments relating to FIGS. 8, 9, 10(A), and 12 the respective support structure 3 (comprising or being formed as a printed circuit board 36) can delimit a through-opening 31 extending from a front side 3a of the support structure 3 to a back side 3b of the support structure 3. Particularly, the respective diffusor 21 can be arranged in front of said through-opening 31, so that light L can pass through the diffusor 21 and through the support structure 3 via said through-opening 31. Particularly, as shown in FIG. 12, the optical device can comprise a static diffusor 210 that faces the movable diffusor 21, wherein the static diffusor 210 can be arranged in front of or in said opening 31. Particularly, the static diffusor 210 can be connected to the back side 3b of the support structure 3.

For moving the diffusor 21 in the embodiments of the optical device 1 shown in FIGS. 8, 9(B), 10(A), and 12, an actuator can be used as described in conjunction with FIG. 13 (see e.g. below). In this case, the optical device 1 preferably comprises a first and a second magnet 70, 71 that can be connected to the membrane 90 (particularly to the back side 90b) as shown in FIGS. 8, 9(B), and 10(A), or the diffusor 21 as shown in FIG. 12. Furthermore, each magnet 70, 71 preferably faces an associated coil assembly 80, 81 connected to the support structure 3. Particularly, as shown in FIGS. 9(B) and 10(A) the device 1 can comprise a return structure 38 arranged on a side of the printed circuit board 36, which side faces away from the diffusor 21.

Particularly, instead of an elastically deformable membrane 90 as described above, the optical device 1 can also comprise at least one elastically deformable string. The string may comprise a polymer or may be formed out of a polymer.

Figure 10C:
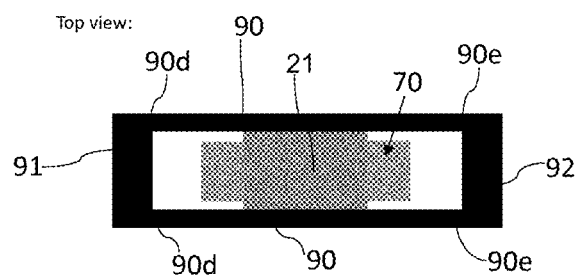

According to the embodiment shown in FIG. 10(C), the optical device 1 can comprise two such strings 90. Particularly, the two strings 90 extend parallel to one another along the support structure 3. Particularly, the respective string 90 comprises a first end section 90d and an opposing second end section 90e, wherein the end sections 90d, 90e are connected to the support structure 3. Particularly, the strings 90 can be integrally formed (e.g. by way of injection molding) with two opposing fastening portions 91, 92, via which fastening portions 91, 92 the two strings 90 are fastened to the support structure 3. The support structure 3 comprises or forms a substrate (e.g. printed circuit board 36) into which a coil assembly 80 as described herein can be integrated. Particularly, the fastening portions 91, 92 can be mounted to the printed circuit board 36. Furthermore, the diffusor 21 can be connected to a back side of the respective string 90, which back side faces the support structure 3. A magnet 70 can be connected to the diffusor 21 and is movable to move the diffusor 21 by means of the coil assembly 80 as will be described in more detail below in conjunction with FIG. 13.

FIG. 13 shows yet another embodiment of an optical device 1 for reducing speckle noise that comprises an elastically deformable member in form of a membrane 90 for supporting the diffusor 21. Particularly, the device 1 comprises: a movable diffusor 21 for diffusing a light beam L passing through said diffusor 21, and a support structure 3 (e.g. frame) for supporting the diffusor 21, wherein the movable diffusor 21 is supported on the support structure 3 by an elastically deformable membrane 90 (comprising e.g. a polymer or being e.g. formed out of a polymer) such that the diffusor 21 is movable along a first motion direction x extending along the support structure 3 and/or along a second motion direction y extending along the support structure 3. The support structure 3 can comprise a printed circuit board. Particularly, the support structure 3 can be a printed circuit board.

Particularly, the diffusor 21 can be connected to a front side 90a of the membrane 90, particularly via a spacer 95 (cf. FIG. 13(B)), wherein the front side 90a of the membrane 90 faces away from the support structure 3. The spacer 95 can be a double sided tape or a plastic part.

Furthermore, preferably, the diffusor 21 forms a cantilever and protrudes beyond the support structure 3 in a first direction D1 as shown in FIG. 13(A).

Further, the optical device 1 can also comprise a static diffusor 210 that faces the movable diffusor 21 (cf. FIG. 13(B)).

For moving the diffusor 21 back and forth the first and/or second motion direction x, y, the optical device 1 comprises an actuator 5 that comprises a coil assembly 80 connected to the support structure 3 as shown in FIG. 13(B) and a magnet 70 connected to the membrane 90 (or alternatively to the movable diffuser 21) such that the magnet 70 faces the coil assembly 80. Particularly, the coil assembly is integrated into the support structure, particularly into the printed circuit board.

As shown in FIG. 13(C), the coil assembly 80 comprises a first layer 80a comprising a first and a second coil 800, 801 arranged side by side so that a section 800a of the first coil 800 extends along an adjacent section 801a of the second coil 801, wherein particularly the first and the second coil 800, 801 are configured such that an electrical current I that flows through the first and through the second coil 800, 801 flows in the same direction in said adjacent sections 800a, 801a, and wherein the coil assembly 80 comprises a second layer 80b, wherein the first and the second layer 80a, 80b are arranged on top of one another, and wherein the second layer 80a comprises a third and a fourth coil 802, 803 arranged side by side so that a section 802a of the third coil 802 extends along an adjacent section 803a of the fourth coil 803, wherein particularly the third and the fourth coil 802, 803 are configured such that an electrical current I that flows through the third and the fourth coil 802, 803 flows in the same direction in said section 802a of the third coil 802 and in said adjacent section 803a of the fourth coil 803, and wherein, in a crossing region C of the coil assembly 80, the section 800a of the first coil 800 and the section 801a of the second coil 801 each cross the section 802a of the third coil 802 and the section 803a of the fourth coil 802.

Furthermore, the magnet 70 comprises a magnetization M1 that points towards or away from the crossing region C of the coil assembly 80. Particularly, the magnetization M1 is preferably orthogonal to a back side 70a of the magnet 70, which back side 70a faces the crossing region C of the coil assembly 80 (cf. FIG. 13(B)).

Furthermore, the magnetization M1 is preferably orthogonal to an electrical current I flowing through one of the sections 800a, 801a, 802a, 803a in the crossing region C of the coil assembly 80

Furthermore, said adjacent sections 800a, 801a of the first and second coil 800, 801 of the first layer 80a of the coil assembly 80 preferably extend along the second motion direction y. Furthermore, said adjacent sections 802a, 803a of the third and fourth coil 802, 803 of the second layer 80b of the coil assembly 80 preferably extend along the first motion direction x.

In order to move the diffusor 21 using the magnet 70 and coils 800, 801, 802, 803 the optical device 1 is configured to apply an electrical current I to the first and the second coil 800, 801 of the first layer 80a of the coil assembly 80 such that the electrical current I flows in the same direction in said adjacent sections 800a, 801a of the first layer 80a of the first coil assembly 80 such that a Lorentz force $F_L$ is generated that moves the diffusor 21 along the first motion direction x.

Similarly, the optical device 1 is preferably configured to apply an electrical current I to the third and to the fourth coil (802, 803) of the second layer 80b of the coil assembly 80 such that the electrical current I flows in the same direction in said adjacent sections 802a, 803a of the second layer 80b of the coil assembly 80 such that a Lorentz force $F_L$ is generated that moves the diffusor 21 along the second motion direction y.

Particularly, the support structure 3 comprises or is formed as a substrate 36, particularly in form of a printed circuit board, wherein the coil assembly 80 is integrated into this substrate 36.

Figure 14A:
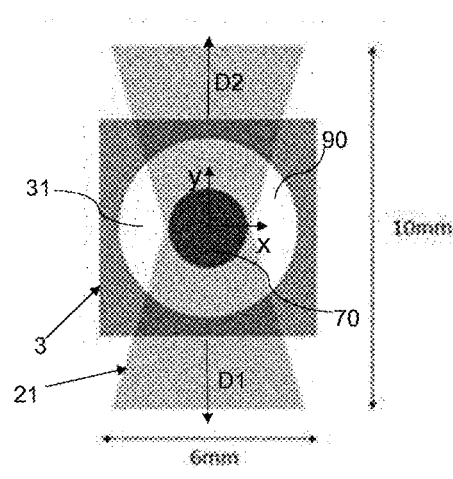
FIGS. 14A-14B show schematical top views (FIG. 14A), (FIG. 14B) of embodiments of an optical device according to the present invention comprising a diffusor supported on at least one elastic membrane for achieving speckle pattern reduction.

FIG. 14(A) shows a modification of the embodiment shown in FIG. 13, wherein here in contrast to FIG. 13, the diffusor 21, which is also supported on the support structure 3 via an elastically deformable membrane 90, protrudes in two opposite direction D1 and D2 past the support structure 3, so that light L can pass through the protruding portions of the diffusor 21 without being affected by the support structure 3. Possible dimensions of the device 1 are indicated as an example in FIG. 14(A). Also here, the magnet 70 can face a coil assembly 80 of an actuator that can be configured as described in conjunction with FIG. 13. Particularly, having the diffusor protrude in both directions D1, D2 increases stability of the system.

Figure 14B:
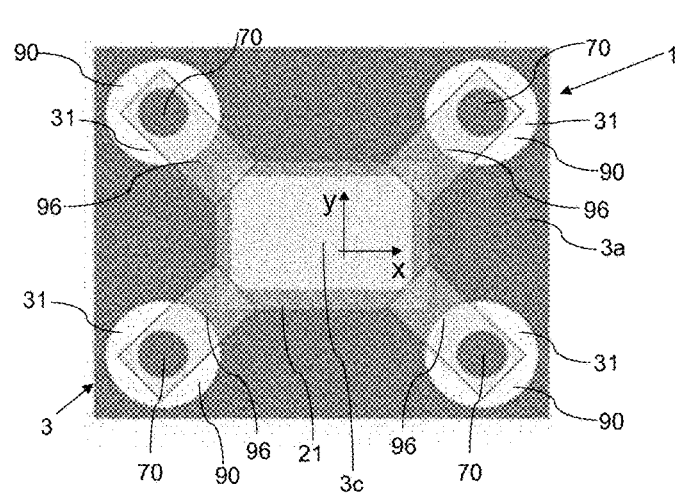

FIG. 14(B) shows a modification of the embodiment of the optical device 1 shown in FIG. 14(A). The optical device comprises a movable diffusor 21 for reducing speckle noise, wherein the diffusor is supported on a support structure 3. Here, one or more membrane units (including motors) can be used to move the diffusor.

Particularly, the support structure 3 delimits at least a first and a second through-opening 3c, 31 extending from a front side 3a of the support structure 3 to a back side (not shown) of the support structure 3, respectively, wherein the movable diffusor 21 is arranged in front of the first (e.g. central) through-opening 3c. Particularly, the second through-opening 31 can also be a recess that does not extend completely through the support structure 3.

The movable diffusor 21 is supported on the support structure 3 by at least one elastically deformable membrane 90 that is connected to the support structure 3 such that it extends in or over the second through-opening 31. Particularly, a magnet 70 is connected to the at least one elastically deformable membrane 90, wherein the diffusor 21 is connected via at least one holding element 96 to the magnet 70. Preferably, the magnet 70 is arranged such that it faces a coil assembly 80 connected to the support structure 3. Also here, the magnet 70 and coil assembly 80 can form part of an actuator described in conjunction with FIG. 13.

Furthermore, as explicitly shown in FIG. 14(B), the optical device 1 may comprise a plurality of second through-openings or recesses 31 (e.g. four such through-openings 31), wherein each second through-opening 31 can be covered by the at least one elastically deformable membrane 90, wherein alternatively a separate elastically deformable membrane comprising a polymer or being formed out of a polymer can be arranged in or over each second through-opening 31. Furthermore, a magnet 70 is arranged in front of or in the respective second through-opening 31 and connected to the at least one membrane 90 or the respective membrane 90, wherein each magnet 70 is arranged in front of a coil assembly 80. Further, each magnet 70 is connected via a holding element 96 to the diffusor 21 to hold the latter in front of the first (e.g. central) through-opening 3c of the support structure 3. Further, particularly, the respective coil assembly 80 and the respective magnet 70 that faces the coil assembly 80 can form part of an actuator described above in conjunction with FIG. 13.

Further, the second through-openings 31 can be arranged around the (e.g. central) first through-opening 3c. Thus, with help of the actuator formed by the coil assemblies 80 and the associated magnets 70, the diffusor is movable along a first motion direction x extending along the support structure 3 and/or along a second motion direction y extending along the support structure 3 according to the principles described herein.

Particularly, the support structure 3 of the optical device 1 shown in FIG. 14 comprises or is formed as a substrate 36, particularly in form of a printed circuit board, wherein the coil assembly 80 (or the coil assemblies 80) is integrated into this substrate 36.

Figure 15:
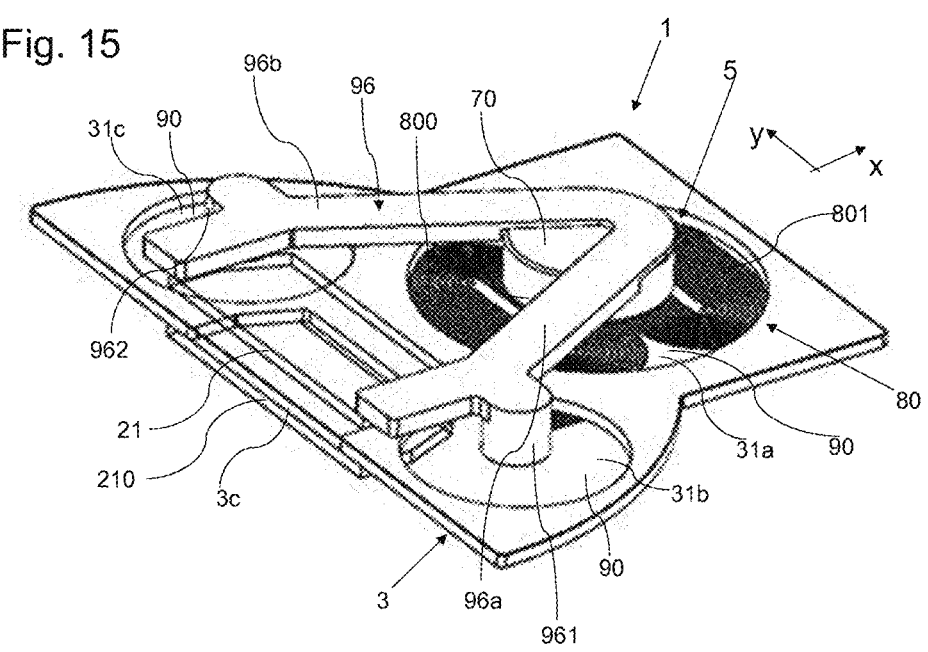
FIG. 15 shows a perspective view of a further embodiment of an optical device according to the present invention comprising a diffusor being supported on at least one elastic membrane for achieving speckle pattern reduction.

FIG. 15 shows yet another embodiment of an optical device 1 for speckle noise reduction. Also here, the device 1 comprises a movable diffusor 21 (and an optional static diffusor 210 facing the movable diffusor 21), wherein the diffuser 21 (and the static diffusor 210) are supported on a support structure 3.

Particularly, the support structure 3 delimits a first, a second and a third through-opening 31a, 31b, 31c extending from a front side 3a of the support structure 3 to a back side 3b of the support structure 3, respectively, wherein the movable diffusor 21 is arranged in front of a recess 3c of the support structure 3, and wherein the movable diffusor 21 is supported on the support structure 3 by an elastically deformable membrane 90 that is connected to the support structure 3 such that it covers said through-opening 31a, 31b, 31c. Alternatively, the openings 31a, 31b, 31c can be covered by separate membranes. Furthermore, the through-openings 31a, 31b, 31c can also be formed as recesses that do not extend completely through the support structure 3.

Furthermore, a magnet 70 is connected to the membrane 90 covering the first through-opening 31a and arranged in front of the first through-opening 31a, wherein particularly the optical device 1 comprises a holding element 96 that connects the diffusor 21 to the magnet 70. As shown in FIG. 15, the holding element 96 can comprises a first arm 96a that connects the magnet 70 to a first protrusion 961 of the holding element 96, wherein the first protrusion 961 is supported on the membrane 90 and arranged in front of the second through-opening 31b, and wherein the holding element 96 can comprise a second arm 96b that connects the magnet 70 to a second protrusion 962 of the holding element 96, wherein the second protrusion 962 is supported on the membrane 90 arranged in front of the third through-opening 31c. Furthermore, the diffusor 21 is connected to the first and to the second arm 96a, 96b), and the magnet 70 is arranged such it faces a coil assembly 80 arranged in front of the opening 31a.

Particularly, the support structure 3 of the optical device 1 shown in FIG. 14 comprises or is formed as a substrate 36, particularly in form of a printed circuit board, wherein the coil assembly 80 is integrated into this substrate 36.

Furthermore, particularly, the coil assembly 80 and the magnet 70 that faces the coil assembly 80 can form part of an actuator described above in conjunction with FIG. 13 for moving the diffusor 21 along the first and/or second motion direction x, y.

Figure 16A:
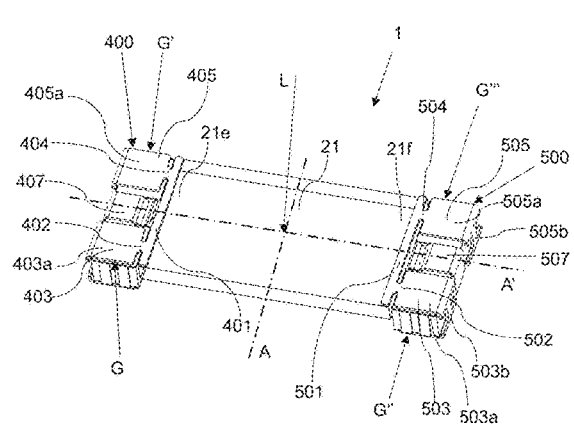
FIGS. 16A-16B show a perspective view (FIG. 16A) of an embodiment of an optical device according to the present invention comprising a tiltable transparent plate for enhancing resolution of an optical image, wherein (FIG. 16B) shows an exploded view of the device.
Figure 16B:
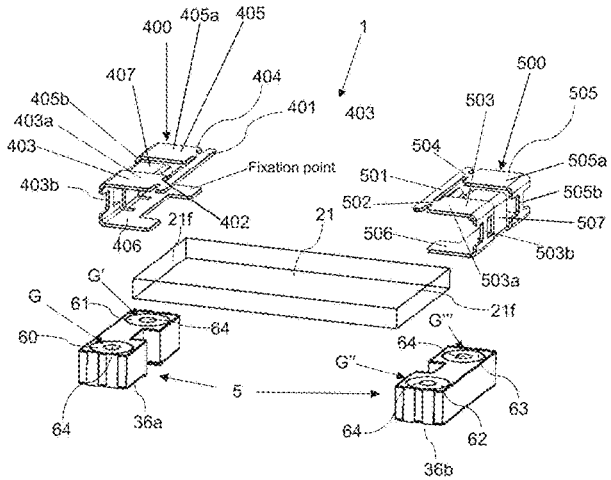

FIG. 16 shows another embodiment of an optical device 1 of the present invention that allows tilting of an optical element 21 (e.g. a transparent plate 21) about two different axes A, A' so that the device can be used for pixel shifting/ enhancing of a resolution of an image as described herein.

Particularly, according to FIG. 16, the optical device 1, comprises a transparent plate 21 for refracting a light beam L passing through said plate 21, wherein the plate 21 is tiltable, and wherein the plate 21 comprises a first end section 21e and an opposing second end section 21f. The transparent plate 21 can be a glass plate 21.

Further, the optical device 1 comprises a first spring structure 400 and an opposing second spring structure 500, wherein the first spring structure 400 comprises an elongated first holding arm 401 connected to the first end section 21e of the plate 21, and wherein the second spring structure 500 comprises an elongated second holding arm 501 connected to the second end section 21f of the plate 21. Particularly, the plate 21 is glued to the holding arms 401, 501.

The first holding arm 401 is connected via a first bar 402 to a first bendable member 403 of the first spring structure 400 and via a second bar 404 to a second bendable member 405 of the first spring structure 400, and wherein the second holding arm 501 is connected via a third bar 502 to a third bendable member 503 of the second spring structure 500 and via a fourth bar 504 to a fourth bendable member 505 of the second spring structure 500.

Furthermore, the first bendable member 403 comprises a top portion 403a and a pillar 403b extending perpendicular to the top portion 403a of the first bendable member 403, wherein the pillar 403b of the first bendable member 403 connects the top portion 403a of the first bendable member 403 to a bottom portion 406 of the first spring structure 400.

Similarly, the second bendable member 405 comprises a top portion 405a and a pillar 405b extending perpendicular to the top portion 405a of the second bendable member 405, wherein the pillar 405b of the second bendable member 405 connects the top portion 405a of the second bendable member 405 to the bottom portion 406 of the first spring structure 400.

Furthermore, the third bendable member 503 comprises a top portion 503a and a pillar 503b extending perpendicular to the top portion 503a of the third bendable member 503, wherein the pillar 503b of the third bendable member 503 connects the top portion 503a of the third bendable member 503 to a bottom portion 506 of the second spring structure 500.

Similarly, the fourth bendable member 505 comprises a top portion 505a and a pillar 505b extending perpendicular to the top portion 505a of the fourth bendable member 505, wherein the pillar 505b of the fourth bendable member 505 connects the top portion 505a of the fourth bendable member 505 to the bottom portion 506 of the second spring structure 500.

For tilting the plate 21, the optical device 1 according to FIG. 16 comprises an actuator 5 that comprises a first and a second coil 60, 61 arranged on the bottom portion 406 of the first spring structure 400 such that the top portion 403a of the first bendable member 403 faces the first coil 60 and forms a first air gap G with the first coil 60, and such that the top portion 405a of the second bendable member 405 faces the second coil 61 and forms a second air gap G' with the second coil 61.

In a similar fashion the actuator 5 further comprises a third and a fourth coil 62, 63 arranged on the bottom portion 506 of the second spring structure 500 such that the top portion 503a of the third bendable member 503 faces the third coil 62 and forms a third air gap G" with the third coil 62, and such that the top portion 505a of the fourth bendable member 505 faces the fourth coil 63 and forms a fourth air gap G''' with the fourth coil 63.

These air gaps G, G', G", G''' are preferably utilized to generate forces for tilting the plate 21 as will be described in the following.

To this end, the first spring structure 400 is configured to guide magnetic flux generated by the first or second coil 60, 61 (when an electrical current is applied to the first or second coil), and wherein the second spring structure 500 is configured to guide magnetic flux generated by the third or fourth coil 62, 63 (when an electrical current is applied to the third or fourth coil). In other words, each spring structure 400, 500 also forms a return structure for the magnetic flux.

Particularly, the optical device 1 is configured to apply an electrical current to the respective coil 60, 61, 62, 63 such that the respective coil 60, 61, 62, 63 attracts the top portion 403a, 405a, 503a, 505a of the associated bendable portion 403, 405, 503, 505 due to a reluctance force generated by the respective coil 60, 61, 62, 63 of the actuator 5.

Particularly, the optical device 1 is configured to apply an electrical current to the first and to the second coil 60, 61 or to the third and to the fourth coil 62, 63 to tilt the plate 21 about a first axis A extending parallel to the holding arms 401, 501.

Furthermore, the optical device 1 is configured to apply an electrical current to the first and to the third coil 60, 62 or to the second and to the fourth coil 61, 63 to tilt the plate about a second axis A' extending perpendicular to the holding arms 401, 501.

Preferably, the respective coil 60, 61, 62, 63 comprises a coil core 64 extending perpendicular to the top portion 403a, 405a, 503a, 505a of the respective bendable member 403, 405, 503, 505.

Furthermore, the actuator 5 preferably comprises a first substrate 36a, wherein the first and the second coil 60, 61 are integrated into the first substrate 36a (the first substrate 36a can be a printed circuit board), and a second substrate 36b, wherein the third and the fourth coil 62, 63 are integrated into the second substrate 36b (the second substrate 36b can be a printed circuit board, too).

Furthermore, for connecting the substrates 36a, 36b with the respective spring structure 400, 500, the first spring structure 400 comprises a first latching arm 407 for engaging with the first substrate 36a of the actuator 5, wherein the first latching arm 407 protrudes from the bottom portion 406 of the first spring structure 400 between the first and the second bendable member 403, 405 of the first spring structure (400), and the second spring structure 500 comprises a second latching arm 507 for engaging with the second substrate 36b of the actuator 5, wherein the second latching arm 507 protrudes from the bottom portion 506 of the second spring structure 500 between the third and the fourth bendable member 503, 505 of the second spring structure 500.

We claim:

1. An Optical device for speckle pattern reduction, comprising:
   a diffusor configured to diffuse a light beam passing through said diffuser to reduce a speckle pattern,
   a support frame configured to support the diffusor,
   a spring structure connected to the support frame, wherein the spring structure comprises a frame to which the diffusor is connected, wherein the frame is moveable with respect to the support frame, and wherein the spring structure comprises a first holding member that is connected via a first spring element to the frame, and an actuator configured to move the frame with respect to the support frame by means of a Lorentz force.

2. The optical device according to claim 1, wherein the spring structure comprises a second holding member that is connected via a second spring element to the frame.

3. The optical device according to claim 2, wherein the spring structure comprises a third holding member that is connected via a third spring element to the frame.

4. The optical device according to claim 3, wherein the spring structure comprises a fourth holding member that is connected via a fourth spring element to the frame.

5. The optical device according to claim 4, wherein the respective spring element comprises one of: a curved portion, an angled portion.

6. The optical device according to claim 1, wherein the spring structure is monolithic.

7. The optical device according to one of the claim 1, wherein the support frame is formed by or comprises a printed circuit board.

8. The optical device according to one of the claim 1, wherein the support frame comprises a first arm that opposes a second arm of the support frame, and wherein the first and the second arm are connected by a third and a fourth arm of the support frame.

9. The optical device according to claim 8, wherein the first and the third arm are joined at a first corner portion of the support frame, and wherein the third and the second arm are joined at a second corner portion of the support frame.

10. The optical device according to claim 1, wherein the actuator comprises a first coil, a second coil, a third coil and a fourth coil, wherein said coils are integrated into the support frame, and wherein the actuator comprises a first magnet facing the first coil, a second magnet facing the second coil, a third magnet facing the third coil, wherein the magnets are connected to the frame.

11. The optical device according to claim 10, wherein the first coil is integrated into a first arm of the support frame, and wherein the second coil is integrated into a second arm of the support frame, and wherein the third coil is integrated into a third arm of the support frame.

12. An optical device for reducing speckle noise, comprising:
a movable diffusor for diffusing a light beam passing through said diffuser,
a support structure supporting the diffusor,
wherein the movable diffusor is supported on the support structure by at least one elastically deformable member such that the diffusor is movable along a first motion direction extending along the support structure and/or along a second motion direction extending along the support structure, and wherein the at least one elastically deformable member is an elastically deformable pillar protruding from the support structure and being configured to allow lateral movement of the diffusor parallel to the support structure.

13. The optical device according to claim 12, wherein the at least one elastically deformable member comprises a metal or is formed out of a metal.

14. The optical device according to claim 12, wherein the diffusor is supported on the support structure by three or four elastically deformable members, wherein each elastically deformable member comprises or is formed out of a metal.

15. The optical device according to claim 12, wherein the pillars are bendable such that the diffusor can be moved parallel to the support structure.

16. The optical device according to claim 12, wherein the support structure delimits at least one recess or delimits at least one through-opening extending from a front side of the support structure to a back side of the support structure.

17. The optical device according to claim 16, wherein the diffusor is arranged in front of said at least one recess or through-opening such that light can pass through the diffusor and through the support structure via said recess or through-opening.

18. The optical device according to claim 12, wherein the optical device comprises an actuator for moving the diffusor along the first motion direction and/or along the second motion direction, wherein the actuator comprises at least a first coil assembly connected to the support structure and at least a first magnet connected to the at least one elastically deformable member and/or to the movable diffusor such that the at least one first magnet faces the at least one first coil assembly.

19. The optical device according to claim 12, wherein the support structure comprises a printed circuit board.

* * * * *